(12) United States Patent
Kashiyama

(10) Patent No.: US 10,331,672 B2
(45) Date of Patent: Jun. 25, 2019

(54) STREAM DATA PROCESSING METHOD WITH TIME ADJUSTMENT

(71) Applicant: Hitachi, Ltd., Tokyo (JP)

(72) Inventor: Toshihiko Kashiyama, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 861 days.

(21) Appl. No.: 14/898,727

(22) PCT Filed: Jun. 21, 2013

(86) PCT No.: PCT/US2013/047120
§ 371 (c)(1),
(2) Date: Dec. 15, 2015

(87) PCT Pub. No.: WO2014/204489
PCT Pub. Date: Dec. 24, 2014

(65) Prior Publication Data
US 2016/0125033 A1     May 5, 2016

(51) Int. Cl.
*G06F 16/00* (2019.01)
*G06F 16/2455* (2019.01)
*G06F 16/2453* (2019.01)

(52) U.S. Cl.
CPC .... *G06F 16/24568* (2019.01); *G06F 16/2453* (2019.01)

(58) Field of Classification Search
CPC ...... G06F 16/20; G06F 16/24; G06F 16/2453; G06F 16/2455; G06F 16/2458; G06F 16/2474; G06F 16/2477; G06F 16/24568
See application file for complete search history.

(56) References Cited

U.S. PATENT DOCUMENTS 6,842,715 B1 * 1/2005 Gaal ................. G01S 19/42
                                                       342/357.25
9,477,722 B1 * 10/2016 Wang ................ G06F 16/2393
(Continued)

FOREIGN PATENT DOCUMENTS

JP     2009266007 A    11/2009
JP     2010108044 A     5/2010
JP     2010108073 A     5/2010

OTHER PUBLICATIONS

Office Action for Japanese Patent Application No. 2016-521387 dated Jan. 27, 2017, 3 pages. Japan Patent Office (untranslated).
(Continued)

*Primary Examiner* — Ashish Thomas
*Assistant Examiner* — Rezwanul Mahmood
(74) *Attorney, Agent, or Firm* — Procopio, Cory, Hargreaves & Savitch LLP

(57) ABSTRACT

Some stream data (e.g., sensor streams) has characteristics in which data is periodically sent to a stream data processing server. When data arrives periodically, to hold a certain period is the same as to hold a certain amount. Example implementations described herein are directed to replacing the range window, which holds a period of stream data, with a row window which holds an amount of stream data. In the same manner, the example implementations replace the range rstream, which outputs results every period, with a row rstream which outputs results for every amount.

20 Claims, 22 Drawing Sheets

(56) References Cited

U.S. PATENT DOCUMENTS

| | | | |
|---|---|---|---|
| 9,674,249 B1* | 6/2017 | Kekre | H04L 65/60 |
| 2005/0076060 A1* | 4/2005 | Finn | G16H 40/20 |
| | | | 707/999.007 |
| 2005/0235356 A1* | 10/2005 | Wang | G06F 16/2477 |
| | | | 726/22 |
| 2007/0136239 A1* | 6/2007 | Lee | G06F 16/83 |
| | | | 707/999.002 |
| 2007/0288459 A1* | 12/2007 | Kashiyama | G06F 16/20 |
| | | | 707/999.006 |
| 2008/0114787 A1* | 5/2008 | Kashiyama | G06F 16/22 |
| | | | 707/999.1 |
| 2008/0275891 A1* | 11/2008 | Park | G06F 16/2458 |
| | | | 707/999.1 |
| 2008/0301124 A1 | 12/2008 | Alves | |
| 2008/0301135 A1* | 12/2008 | Alves | G06F 16/2453 |
| | | | 707/999.006 |
| 2009/0100029 A1* | 4/2009 | Jain | G06F 16/2474 |
| | | | 707/999.004 |
| 2009/0106218 A1* | 4/2009 | Srinivasan | G06F 16/24556 |
| | | | 707/999.004 |
| 2009/0271529 A1* | 10/2009 | Kashiyama | G06F 16/2455 |
| | | | 710/1 |
| 2010/0106710 A1* | 4/2010 | Nishizawa | G06F 16/24556 |
| | | | 707/714 |
| 2010/0106853 A1* | 4/2010 | Kashiyama | G06Q 10/06 |
| | | | 709/231 |
| 2010/0138438 A1* | 6/2010 | Torikai | G06F 16/24568 |
| | | | 707/759 |
| 2011/0016160 A1* | 1/2011 | Zhang | G06F 16/24 |
| | | | 707/805 |
| 2011/0029554 A1* | 2/2011 | Ito | G06F 16/24568 |
| | | | 707/769 |
| 2011/0125778 A1* | 5/2011 | Kubo | G06F 16/24568 |
| | | | 707/769 |
| 2012/0078868 A1* | 3/2012 | Chen | G06F 16/24568 |
| | | | 707/706 |
| 2012/0078939 A1* | 3/2012 | Chen | G06F 16/24568 |
| | | | 707/769 |
| 2012/0166421 A1 | 6/2012 | Cammert et al. | |
| 2013/0091123 A1* | 4/2013 | Chen | G06F 16/24568 |
| | | | 707/722 |
| 2013/0290367 A1* | 10/2013 | Kashiyama | G06F 16/2474 |
| | | | 707/769 |
| 2013/0307536 A1* | 11/2013 | Feng | G01R 33/5608 |
| | | | 324/309 |
| 2013/0346441 A1* | 12/2013 | Imaki | H04L 41/147 |
| | | | 707/769 |
| 2014/0012871 A1* | 1/2014 | Jeon | G06F 16/24556 |
| | | | 707/769 |
| 2014/0095525 A1* | 4/2014 | Hsiao | G06F 16/24568 |
| | | | 707/759 |
| 2014/0181144 A1* | 6/2014 | Kashiyama | G06F 16/24568 |
| | | | 707/773 |
| 2014/0201355 A1* | 7/2014 | Bishnoi | H04L 41/069 |
| | | | 709/224 |
| 2014/0229628 A1* | 8/2014 | Mandal | H04L 65/60 |
| | | | 709/231 |
| 2016/0125033 A1* | 5/2016 | Kashiyama | G06F 16/2453 |
| | | | 707/713 |

OTHER PUBLICATIONS

Office Action for Japanese Patent Application No. 2016-521387 dated Jan. 27, 2017, 3 pages. Japan Patent Office (English translated).

International Search Report (PCT/US13/47120) dated Jan. 10, 2014.

* cited by examiner

501: register stream S1 (dsTime Timestamp, id String, val Float);
register stream S2 (dsTime Timestamp, id String, val Float);

502: register query Q1 rstream [1 second] (
select id, sum(val)
from S1[range 3 second]
group by id);

503: register query Q2 rstream [60 second] (
select S1.id, S1.val, S2.val
from S1[range 5 second], S2[range 12 second]
where S1.id = S2.id);

Fig. 5

Stream Data Interval Definition Table 418

| stream 601 | grouping 602 | interval 603 | interval adjust 604 |
|---|---|---|---|
| S1 | id | 1sec | no |
| S2 | - | 3sec | yes |
| ... | ... | ... | ... |

RStream Output Interval Definition Table 419

| query 701 | grouping 702 | interval 703 | output adjust 704 |
|---|---|---|---|
| Q1 | id | 1sec | no |
| Q2 | - | 3sec | yes |
| ... | ... | ... | |

1401
```
register stream S1 (dsTime Timestamp, id String, val Float)
    interval 1 second group by id;
register stream S2 (dsTime Timestamp, id String, val Float)
    interval 3 second with interval adjust;
```

1402
```
register query Q1
rstream [1 second, interval 1 second group by id] (
select id, sum(val)
from S1[range 3 second]
group by id);
```

1403
```
register query Q2
rstream [60 second, interval 3 second with output adjust] (
select S1.id, S1.val, S2.val
from S1[range 5 second], S2[range 12 second]
where S1.id = S2.id);
```

Fig. 14

```
register stream S1 (dsTime Timestamp, id String, val Float);
register stream S2 (dsTime Timestamp, id String, val Float);
```
2001

```
register query Q1 rstream [partition by id rows 1] (
select id, sum(val)
from S1[partition by id rows 3]
group by id);
```
2002

```
register query Q2 rstream [rows 20] (
select S1.id, S1.val, S2.val
from S1[partition by id rows 5], S2[rows 4]
where S1.id = S2.id);
```
2003

Fig. 20

STREAM DATA PROCESSING METHOD WITH TIME ADJUSTMENT

BACKGROUND

Field

The example implementations described herein are related generally to computer systems and, more particularly, to a stream data processing method with time adjustment.

Related Art

Stream data processing is widely used in the related art. There has been an increasing demand for a data processing system which carries out real-time processing for data continuously arriving at a database management system (hereafter, referred to as "DBMS"), which carries out processes for data stored in the storage system. For example, in a system for trading stocks, how fast the system can react to changes in stock prices is one of the most important factors, and a method such as the one carried out by a conventional DBMS, in which stock data is first stored in a storage system and then the stored data is searched for, cannot immediately respond in correspondence with the speed of the changes in stock prices, and may result in losing business opportunities.

For example, the related art involves a mechanism which issues stored queries periodically. However, it is difficult to apply this mechanism to the real time data processing for executing a query immediately after data such as stock prices is input.

Data which continuously arrives is defined as stream data, and there has been proposed a stream data processing system as a data processing system suitable for the real-time processing for the stream data.

In the stream data processing system, first, queries are registered to the system, and the queries are executed continuously each time data arrives, which is different from the related art DBMS. The related art implementations employ a sliding window, which partially cuts stream data for efficiently processing the stream data to thereby impart a lifetime to the data. As an example of query description language including a sliding window specification, there is a continuous query language (CQL) in the related art. The CQL includes an extension for specifying the sliding window by using parentheses following a stream name in a FROM clause of a structured query language (SQL), which is widely used for DBMS in the related art.

There are two types of related art methods for specifying the sliding window: (1) a method of specifying the number of data rows to be cut, and (2) a method of specifying a time interval containing data rows to be cut. For example, "Rows 50 Preceding" is a related art example of item (1), in which data corresponding to 50 rows is cut to be processed, and "Range 15 Minutes Preceding" is a related art example of item (2), in which data for 15 minutes is cut to be processed. In the case of item (1), the data lifetime is defined to be until 50 pieces of data arrive. In the case of item (2), the data lifetime is defined to be 15 minutes. The stream data cut by the sliding window is retained on a memory, and is used for the query processing.

In stream data, data sometimes arrives with a delay depending on the state of a network, a device, or the like. For example, a sensor node does not transmit data if the network is disconnected, and transmits the data collectively when a connection is again established.

Developers may write CQL to keep stream data in a certain period to monitor sensor status, catch some abnormal point, and predict future failure.

Related art stream data processing servers process stream data based on a data arrival timestamp. When the data arrives with a delay, aggregation results within a certain period based on an arrival timestamp are different from the results based on a data source timestamp.

Some types of stream data processing servers have a capability to process stream data based on a data source timestamp. However, the server should wait until all data arrives to the server. The processing latency gets longer as a result.

In FIG. 1, sensors 101, 102, and 103 are connected with stream data processing server 121 by network (NW) 111. Development client 131 sends query 151 written in CQL to stream data processing server 121. Stream data processing server 121 processes based on queries sent by development client 131. Visualization client 132 displays the results processed in stream data processing server 121. File server 133 stores the results processed in stream data processing server 121. Tuples 141, 142 and 143 are sent by sensor 101. Tuples 144, 145, 146 are sent by sensor 102. These tuples are processed into corresponding tuples 171-176.

For example, sensor 101 sends tuple (each record in stream data) 141 with timestamp "9:00:01" into stream data processing server 121. Sensor 102 also sends tuple 144 with timestamp "9:00:01" into stream data processing server 121. A 3-second summation of the value of sensor 101 is calculated as "1+2+3=3" at 9:00:03 (tuple 173).

When tuple 146 arrives at stream data processing server 121 at "9:00:04" by a delay on a state of a NW, a 3-second summation of sensor 102 value is calculated as "1+2=3", although developer 161 expects the result "1+2+3=6".

FIG. 2 shows a time chart of Query 151, "rstream [1 second] (select id, sum(val) from S1[range 3 second] group by id)". This means that stream data processing server 121 keeps three seconds of stream data S1 and calculates the summation in each group "id" and outputs the current id and summation data ("id, sum(val)) every one second.

Tuples 201-209, and 211-219 are sent at various time intervals, processed by a Range 3 second function into tuples 221-229, 231-239, undergo a sum(val) function at 241-251, 261-271, and returned to RStream at 281-289, 291-299. Here, tuple 201 arrives at 9:00:01. Tuple 204 arrives after 9:00:04 though tuple 204 has a data source timestamp of 9:00:04.

Each black circle, each white circle, and each line connecting the two circles indicates a predetermined lifetime (three seconds in this example) of each tuple. For example, it is indicated that the tuple 221 has the values (data source timestamp data sensor ID, value)=(9:00:01, a, 1), and the lifetime thereof is from 9:00:01 until 9:00:04. It should be noted that the black circle means that a current point in time is included, while the white circle means that the current point in time is excluded.

For example, the summation of sensor "a" at 9:00:03 is 6 (tuple 243) because tuples 221, 222, and 223 are in its lifetime. At 9:00:04 the lifetime of tuple 221 ends. The summation changes into 5 (tuple 244). After tuple 204 arrives, the summation changes again into 9. Based on the data source timestamp, the summation at 9:00:04 should be 9. However, the actual result is 5. In the same manner, the result at 9:00:07 is 22 (tuple 248) though the result based on the data source timestamp should be 18.

RStream [1 second] outputs the current summation results every second. Tuple 283 (a,6) is sent at 9:00:03 and Tuple 284 (a,5) is sent at 9:00:04. Based on the data source timestamp, tuple 284 should be (a,9). However, the actual result is (a,5) due to delay. In the same manner, the result at 9:00:06 is Tuple 287 (a, 22) though the result based on data source timestamp should be (a,18). As a result, it may become difficult to provide the result based on a data source timestamp in stream data processing server based on an arrival timestamp.

SUMMARY

Aspects of the present application may include a computer program containing instructions for executing a process. The instructions may include determining one or more stream data interval definitions from stream data interval information; and generating an input interval check module configured to detect periodic arrival of stream data based on the one or more stream data interval definitions. For each of the one or more stream data interval definitions, the instructions may further include configuring a query execution module by determining one or more range window operators of the query execution module associated with said each of the one or more stream data interval definitions; modifying the determined one or more range window operators into one of a row sliding window operator and a partition row sliding window operator; and adjusting row window size of the query execution module. The computer program may be stored in a computer readable storage medium or a computer readable signal medium, depending on the desired implementation.

Aspects of the present application may include a method. The method may include determining one or more stream data interval definitions from stream data interval information; and generating an input interval check module configured to detect periodic arrival of stream data based on the one or more stream data interval definitions. For each of the one or more stream data interval definitions, the method may further include configuring a query execution module by determining one or more range window operators of the query execution module associated with said each of the one or more stream data interval definitions; modifying the determined one or more range window operators into one of a row sliding window operator and a partition row sliding window operator; and adjusting row window size of the query execution module.

Aspects of the present application may include a server/computer platform, which can include a processor, configured to determine one or more stream data interval definitions from stream data interval information; and generate an input interval check module configured to detect periodic arrival of stream data based on the one or more stream data interval definitions. For each of the one or more stream data interval definitions, the processor may be further configured to configure a query execution module by determining one or more range window operators of the query execution module associated with said each of the one or more stream data interval definitions; modifying the determined one or more range window operators into one of a row sliding window operator and a partition row sliding window operator; and adjusting row window size of the query execution module.

BRIEF DESCRIPTION OF THE DRAWINGS

FIG. 5 illustrates an example query, in accordance with an example implementation.

FIG. 6 illustrates a Stream Data Interval Definition Table, in accordance with an example implementation.

FIG. 7 illustrates an RStream Output Interval Definition Table, in accordance with an example implementation.

FIG. 14 illustrates an example query, in accordance with an example implementation.

FIG. 20 illustrates an example query, in accordance with an example implementation.

DETAILED DESCRIPTION

Some example implementations are described with reference to drawings. The example implementations that are described herein do not restrict the inventive concept, and one or more elements that are described in the example implementations may not be essential for implementing the inventive concept. Further, although certain elements may be referred to in the singular form, the elements are not intended to be limited to the singular and may also be implemented with one or more of the same element, depending on the desired implementation.

In the following descriptions, the process is described while a program is handled as a subject in some cases. For a program executed by a processor, the program executes the predetermined processing operations. Consequently, the program being processed can also be a processor. The processing that is disclosed while a program is handled as a subject can also be a process that is executed by a processor that executes the program or an apparatus that is provided with the processor (for example, a control device, a controller, and a storage system). Moreover, a part or a whole of a process that is executed when the processor executes a program can also be executed by a hardware circuit as substitute for or in addition to a processor.

The instructions for the program may be stored in a computer readable storage medium, which includes tangible media such as flash memory, random access memory (RAM), Hard Disk Drive (HDD) and the like. Alternatively, instructions may be stored in the form of a computer readable signal medium, which includes other media such as carrier waves.

Example implementations described herein are directed to replacing the range window, which holds a certain period of stream data, with a row window which holds a certain amount of stream data. In the same manner, the example implementations replace the range rstream, which outputs results every certain period, with a row rstream which outputs results every certain amount.

Figure 1:
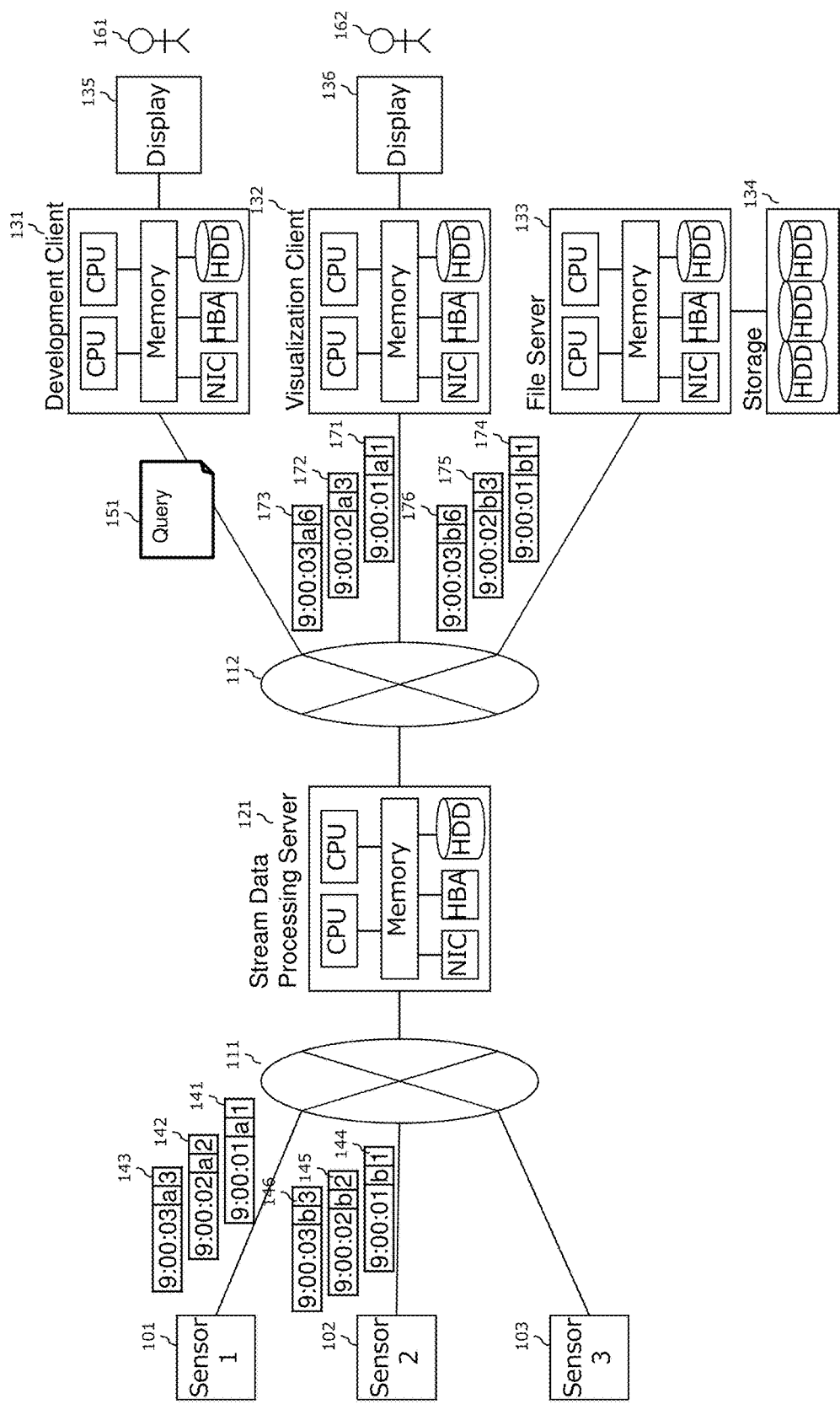
FIG. 1 illustrates an example system involving a stream data processing server.
Figure 2:
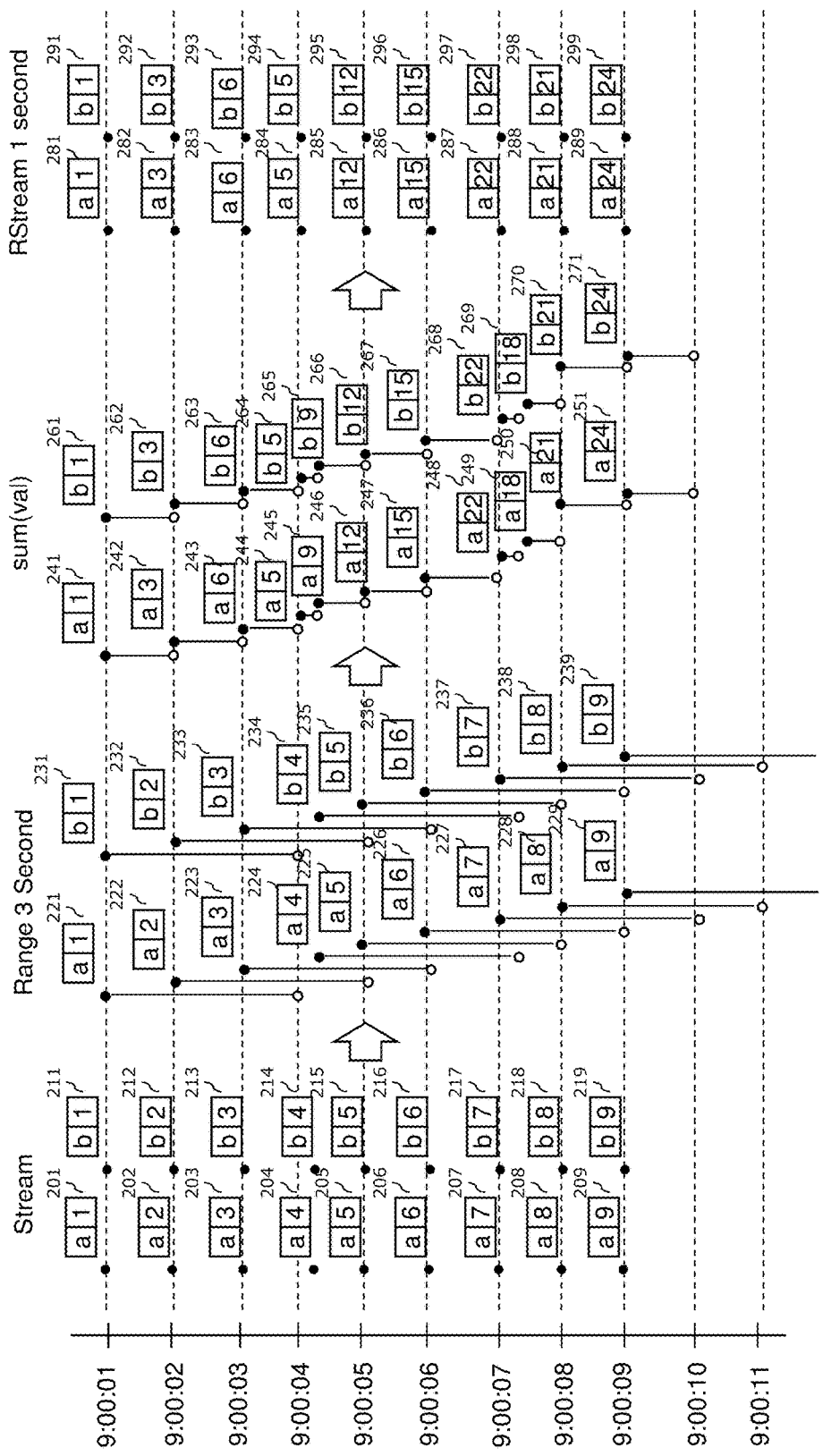
FIG. 2 illustrates an example processing of tuples with rstream.
Figure 3:
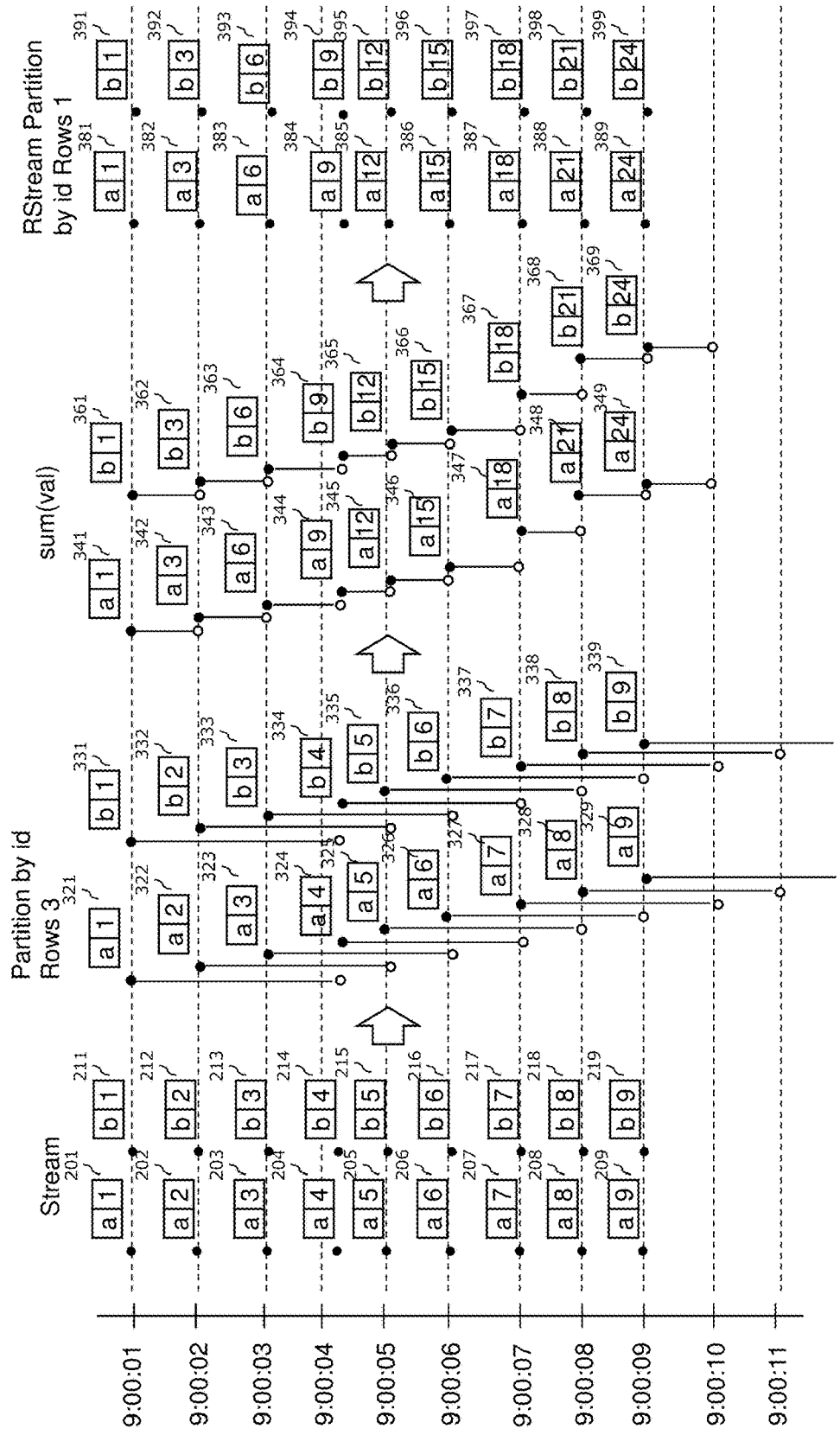
FIG. 3 illustrates an example processing of tuples in accordance with an example implementation.

FIG. 3 illustrates an example processing of tuples in accordance with an example implementation. Specifically, FIG. 3 illustrates a time chart of a query. Tuples 201-219 are the same as in FIG. 2. Tuples 201-209 are sent every second. The query holds 3-second data, as in FIG. 2. To hold 3 seconds (range 3 second) is the same as to hold 3 amount (partition by three id rows), and tuples 321-329 and 331-339 are the tuples resulting from a partition by id Rows 3 function. The tuples are summed as in FIG. 2, to provide tuples 341-349, 361-369, and sent to Rstream to provide resulting tuples 381-389, 391-399.

The lifetime of tuple 221 ends at 9:00:04. However, the lifetime of tuple 321 extends after 9:00:04. As a result, the summation at 9:00:04 is still 6 (tuple 343). After tuple 204 arrives, the summation is changed into 9 (tuple 344). In the same manner, tuple 248 is not shown in FIG. 3. Row Rstream outputs the current result for every specified amount (in this example, every 1 tuple). Tuple 284 (a,5) in FIG. 2 is changed into tuple 384 (a,6). Note that tuple 384 outputs after 9:00:04.

Accordingly, the server can provide the result based on a data source timestamp in the stream data processing server based on the arrival timestamp. This may allow for a lower latency than processing methods which are based on a data source timestamp because the server does not need to wait until all data arrives to the server.

First Example Implementation

Figure 4A:
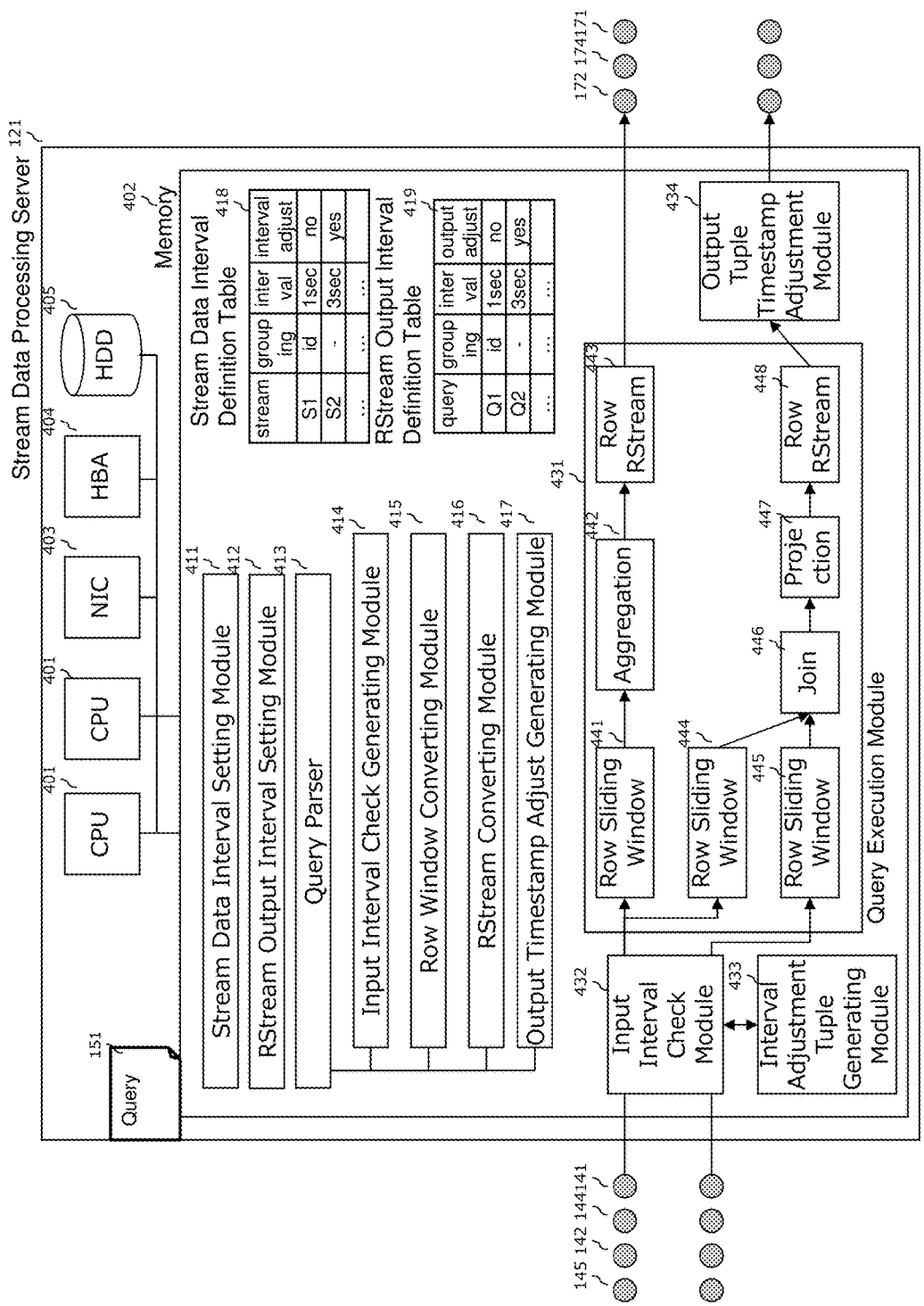
FIG. 4A illustrates an example Stream Data Processing Server, in accordance with an example implementation.

FIG. 4A illustrates an example Stream Data Processing Server 121, in accordance with an example implementation. The stream data processing server 121 may include a memory 402, one or more central processing units (CPUs) 401, a Network Interface Controller 403, a host bus adapter (HBA) 404, and one or more HDDs 405. In FIG. 4A, the Stream Data Interval Setting Module 411 receives the stream data interval setting command and updates the stream data interval definition table 418. RStream Output Interval Setting Module 412 receives the rstream output interval setting command and updates the RStream Output Interval Definition Table 419. Query Parser 413 parses Query 151 and generates Query Execution Module 431. Input Interval Check Generating Module 414 inserts Input Interval Check Module 432 before Query Execution Module 431, and inserts Interval Adjustment Tuple Generating Module 433 to connect with the input interval check module 432. Row Window Converting Module 415 replaces the range sliding window operator with the row sliding operator.

RStream Converting Module 416 replaces the range rstream operator with the row rstream operator. Further details are provided in FIG. 10.

Output Timestamp Adjust Generating Module 417 inserts Output Tuple Timestamp Adjustment Module 434 after the Query Execution Module 431. Further details are provided in FIG. 11.

Query Execution Module 431 includes multiple operators such as sliding window, join, etc. Operators are connected with a queue, which manages the execution order of operators by utilizing job scheduling algorithms (round-robin, leaf to root in execution tree, etc.). Query Execution Module 431 receives input stream 141-148 and outputs output stream 171-176.

Input Interval Check Module 432 checks that stream data arrives periodically. If the stream data does not arrive periodically, the stream is processed by Interval Adjustment Tuple Generating Module 433. Interval Adjustment Tuple Generating Module 433 drops a tuple if more tuples arrived than expected, and inserts an interval adjustment tuple when a tuple is missing or omitted.

Output Tuple Timestamp Adjustment Module 434 modifies the timestamp of the result based on the arrival interval.

Row Sliding Window Operators 441, 444, and 445 cut out data rows from the stream data, and perform a process of converting the stream data into a tuple set, respectively. There are two types of Row Sliding Window Operators: a row sliding window operator which holds a specific amount of data in the entire stream of data such as S1; and a partition row sliding window operator which holds a specific amount of data in each group such as the sensor id on a data stream.

Aggregation Operator 442 performs an aggregation process represented by derivation of a sum, an average, a maximum, a minimum, a count, a variance, a standard deviation, a median, or the like.

Row RStream Operators 443 and 448 perform a process of converting the tuple set into the output stream data in specified amounts. There are two types of Row RStream Operators: a row RStream Operator which outputs the result of a specific amount of data in the entire output, and a partition row rstream operator which outputs the result of a specific amount of data in each group on a data stream.

Join Operator 446 performs a process of joining two or more streams of data under a given condition. Join Operator 446 has a temporary storage to hold the tentative combining result.

Projection Operator 447 performs a process of outputting only a portion of the columns.

In addition to the operators shown in FIG. 4A, there are scan operators which add a timestamp to an input tuple; filter operators which perform a process of determining whether or not the tuples are output based on predetermined conditions; union operators which merge both outputs of two inputs; ranking operators which calculate ranking in a specific column (or multiple columns); and other such operators. The Query Execution Module 431 can be configured to include or omit such operators depending on the desired implementation.

Figure 4B:
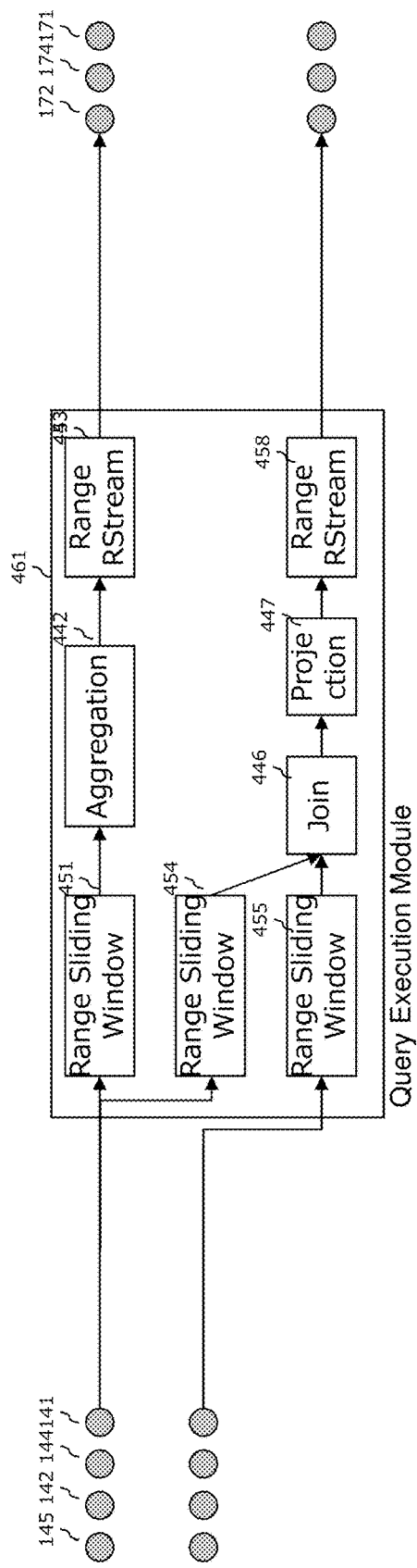
FIG. 4B illustrates a query execution module parsed in accordance with an example implementation.

FIG. 4B illustrates a query execution module parsed in accordance with an example implementation. Query Execution Module 461 is converted into Query Execution Module 431, Input Interval Check Module 432, Interval Adjustment Tuple Generating Module 433, and Output Tuple Timestamp Adjustment Module 434. Range sliding window operators 451, 454, and 455 cut out data from a certain amount of period. Range Rstreams 453 and 458 perform a process of converting the tuple set into the stream data every specific period.

FIG. 5 illustrates an example query, in accordance with an example implementation. Stream registration command 501 indicates a registration of a command to the stream data processing server. S1 has three columns: dsTime as Timestamp type, id as String type, and val as Float type. At 502, the query name is Q1 (register query Q1), which holds tuples of a stream named S1 within a range of past three seconds (FROM S1 [Range 3 second]); calculates the summation of val column in each id ( . . . sum(val) . . . group by id); and outputs the current result every one second (rstream [1 second]). At 503, the query name is Q2 (register query Q2), which holds tuples of a stream named S1 within a range of past five seconds (FROM S1 [Range 3 second]), and holds tuples of a stream named S2 within a range of past twelve seconds (FROM S2 [Range 12 second]), then joins S1 and S2 in a condition "S1.id=S2.id" (where S1.id=S2.id) and extracts multiple columns "S1.id, S1.val, S2.val" from the joining result (select S1.id, S1.val, S2.val). The current result is output every 60 seconds (rstream [60 second]).

When stream registration commands 501-503 are parsed with the query parse method, FIG. 4B is generated. After the range sliding window and range rstream are moved into the row sliding window and row rstream, Operators 441-448 are generated.

FIG. 6 illustrates a Stream Data Interval Definition Table, in accordance with an example implementation. Stream Data Interval Definition Table manages stream data interval information, including stream column 601, grouping column 602, interval column 603, and interval adjust column 604. In example entries, S1 Row 611 indicates that the stream name is "S1", the grouping column is "id", the interval column is "1 second", and the interval adjustment column is "no". S2 Row 612 indicates that the interval is "3 seconds", and the interval adjustment column is "yes".

FIG. 7 illustrates an RStream Output Interval Definition Table, in accordance with an example implementation. RStream Output Interval Definition Table manages rstream output interval information, including query column 701, grouping column 702, interval column 703, and output adjust column 704. In example entries, Q1 Row 711 indicates that the query name is "Q1", the grouping column is "id", the output interval is "1 second", and the output adjustment function is "no". Q2 Row 712 indicates that the output interval is "3 seconds" and the output adjustment function is "yes".

Figure 8:
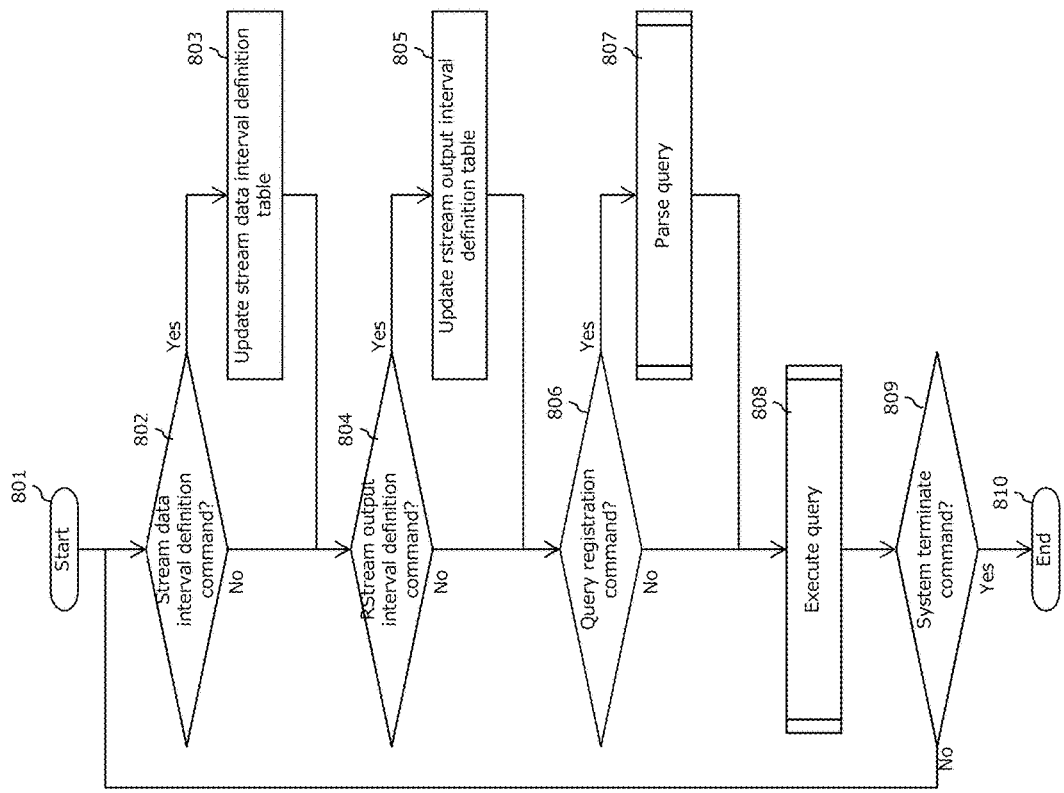
FIG. 8 illustrates an example flowchart showing an overall process performed in the stream data processing server, in accordance with an example implementation.

FIG. 8 illustrates an example flowchart showing an overall process performed in the stream data processing server 121, in accordance with an example implementation. The process begins at 801. At 802, the Stream Data Interval Setting Module 411 determines whether or not an input command is a stream data interval definition command. If so (Yes), Stream Data Interval Setting Module 411 updates the Stream Data Interval Definition Table at 803. At 804, RStream Output Interval Setting Module 412 determines whether or not an input command is an rstream output interval definition command. If so (Yes), RStream Output Interval Setting Module 412 updates the rstream output interval definition table at 805. At 806, Query Parser 413 determines whether or not an input command is query registration command. If so (Yes), Query Parser 413 parses the query at 807. At 808, Query Execution Module 431 executes the queries. At 809, RStream Output Interval Setting Module 412 determines whether or not an input command is a system terminate command. If so (Yes) then the process ends at 810, otherwise, the process goes back to 802.

Figure 9:
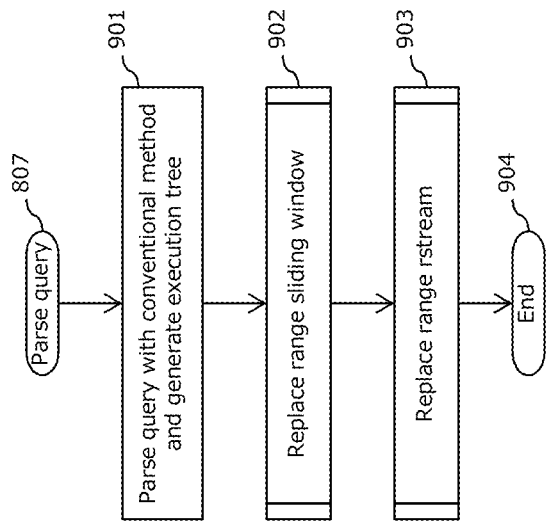
FIG. 9 illustrates a flow diagram for parsing a query, in accordance with an example implementation.

FIG. 9 illustrates a flow diagram for parsing a query 807, in accordance with an example implementation. At 901, Query Parser 413 parses the query and generates execution tree 431 as illustrated in FIG. 4B. At 902, Row Window Converting Module 415 replaces range sliding window operators with row sliding window operators, as described in FIG. 10. At 903, RStream Converting Module 416 replaces the range rstream operators with the row rstream operators, as described in FIG. 11. The process ends at 904.

Figure 10:
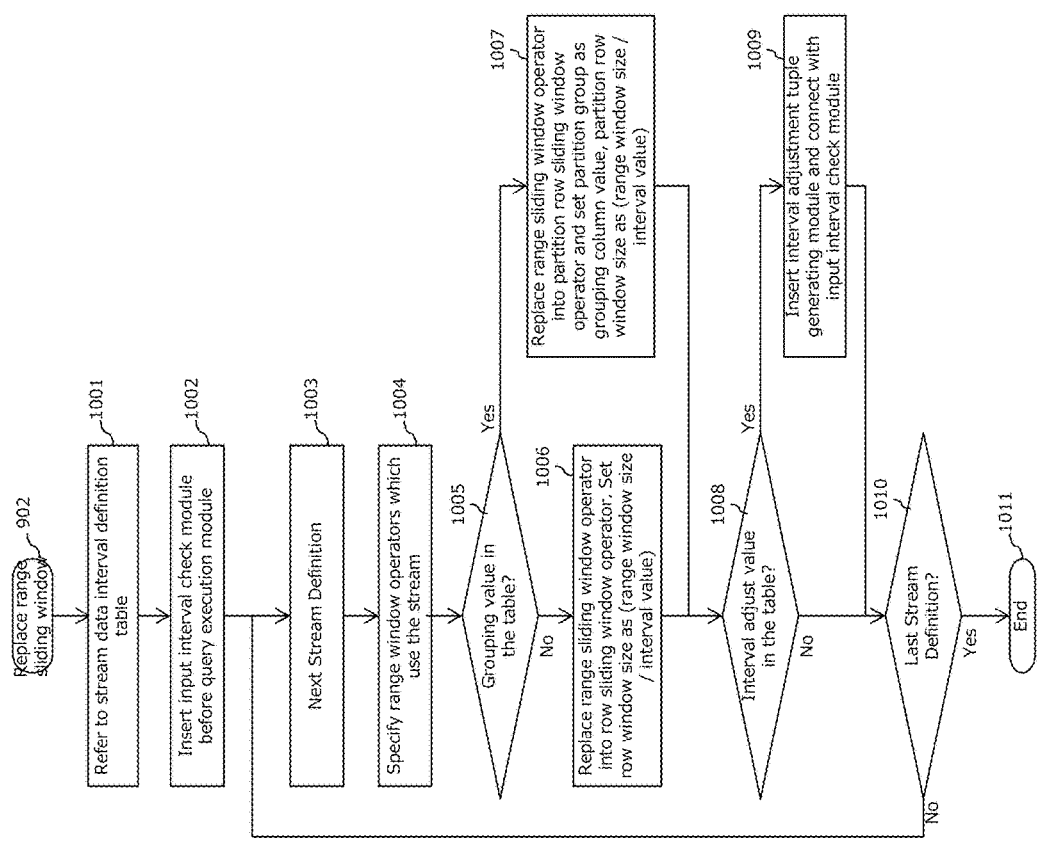
FIG. 10 illustrates a flow diagram for replacing the range sliding window, in accordance with an example implementation.

FIG. 10 illustrates a flow diagram for replacing the range sliding window 902, in accordance with an example implementation. At 1001, Row Window Converting Module 415 refers to the Stream Data Interval Definition Table 418 as illustrated in FIG. 6. At 1002, Input Interval Check Generating Module 414 inserts Input Interval Check Module 432 between Stream Data Inputs 141-148 and Query Execution Module 431. At 1003, Row Window Converting Module 415 refers to the next stream definition row in Stream Data Interval Definition Table 418. At 1004, Row Window Converting Module 415 specifies the range window operators which use the value of stream column 601. At 1005, Row Window Converting Module 415 determines whether or not the value of grouping column 602 in Stream Data Interval Definition Table 418 is set. If not (No), Row Window Converting Module 415 replaces the range sliding window operators into the row sliding window operators at 1006. Row Window Converting Module 415 then sets the row window size as "(range window size/interval value)".

If so (Yes), then Row Window Converting Module 415 replaces the range sliding window operators into the partition row sliding window operators, and sets the partition group as grouping column value 602, and the partition row window size as "(range window size/interval value)" at 1007. At 1008, Input Interval Check Generating Module 414 determines whether or not the value of the interval adjust column 604 in 418 is "yes". If so (Yes), Input Interval Check Generating Module 414 inserts Interval Adjustment Tuple Generating Module 433 and connects with Input Interval Check Module 432 at 1009. At s1010, Row Window Converting Module 415 determines whether or not there is a last stream definition row in Stream Data Interval Definition Table 418. If so (Yes) then the process ends 1011, otherwise (No), the process repeats at 1003.

Figure 11:
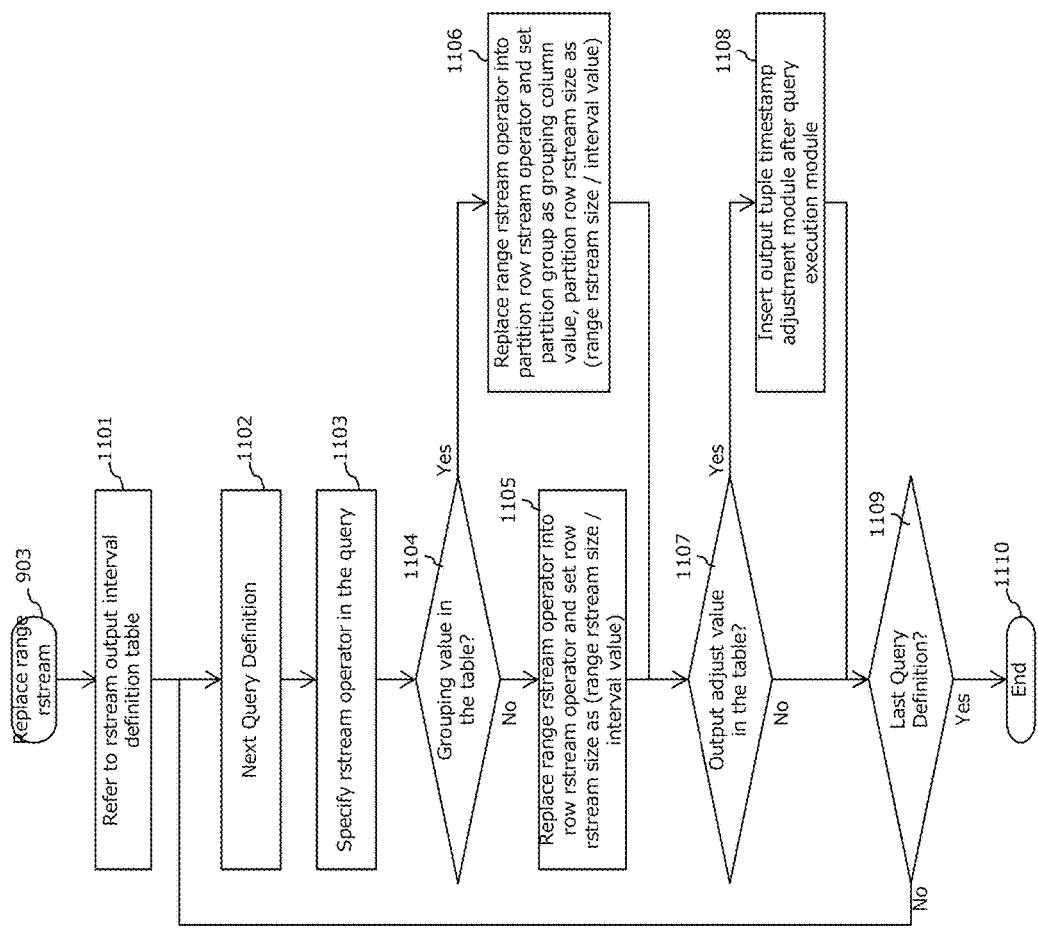
FIG. 11 illustrates a flow diagram for replacing range rstream, in accordance with an example implementation.

FIG. 11 illustrates an example flow diagram for replacing range rstream 903, in accordance with an example implementation. At 1101, Rstream Converting Module 416 refers to Rstream Output Interval Definition Table 419 from FIG. 7. At 1102, Rstream Converting Module 416 refers to the next query definition row in Rstream Output Interval Definition Table 419. At 1103, Rstream Converting Module 416 specifies the rstream operators in the query in Rstream Output Interval Definition Table 419. At 1104, Rstream Converting Module 416 determines whether or not the value of grouping column 702 in Rstream Output Interval Definition Table 419 is set.

If not (No), Rstream Converting Module 416 replaces the range rstream operator into the row rstream operator, and sets the row rstream size as (range rstream size/interval value) at 1105. If so (Yes), then Rstream Converting Module 416 replaces the range rstream operator into the partition row rstream operator and sets the partition group as the grouping column value, and the partition row rstream size as (range rstream size/interval value) at 1106. At 1107, Output Timestamp Adjust Generating Module 417 determines whether or not the value of the output adjust column 704 in the Rstream Output Interval Definition Table 419 is "yes". If so (Yes), then Output Timestamp Adjust Generating Module 417 inserts Output Tuple Timestamp Adjustment Module 434 between Query Execution Module 431 and output 171-176 at 1108. At 1109, Rstream Converting Module 416 determines whether or not there is a last query definition row in Rstream Output Interval Definition Table 419. If so (Yes), then the process ends at 1110, otherwise (No), the process proceeds to 1102.

In an example execution of the flow diagram of FIG. 10, Query Execution Module 461 in FIG. 4B is made after 901. At 1002 in FIG. 10, Input Interval Check Module 432 is inserted between Stream Data Inputs 141-146 and Query Execution Module 461. At 1003, the process refers to S1 Row 611 in Stream Data Interval Definition Table 418 in FIG. 6. At 1004, S1 is used in Query 502 ("from S1[range 3 second]") and Query 503 ("from S1 [range 5 second], S2[range 12 second]") from FIG. 5. Range Sliding Windows 451 and 454 are specified. When the flow at 1005 is yes, the process moves Range Sliding Window Operators 451 and 454 into Partition Sliding Window Operators 431 and 434 at 1007. The partition group is set as grouping column value 602 ("id"), and the partition row window size is set as "(range window size (3 second)/interval value (1 second) =3)". This is the same as "S1[partition by id rows 3]".

When the flow at 1008 is No, and the flow at 1010 is No, the flow at 1003 refers to S2 Row 612 in Stream Data Interval Definition Table 418 in FIG. 6. At 1004, S2 is used in Query 503 ("from S1[range 5 second], S2[range 12 second]") in FIG. 5. Range Sliding Window Operator 455 is specified. When the flow 1005 is No, the flow at 1006 moves Range Sliding Window Operator 455 into Row Sliding Window Operator 444. The row window size is set as (range window size (12 second)/interval value (3 second)=4), which is the same as "S2[rows 4]". When the flow at 1008 is Yes, the flow 1009 inserts Interval Adjustment Tuple Generating Module 433 and connects it to Input Interval Check Module 432. When the flow at 1010 is Yes, the process ends.

In an example execution of the flow diagram of FIG. 11, the flow at 1102 refers to row 711 in Rstream Output Interval Definition Table 419 in FIG. 7. At step 1103, rstream is used in Query 502 ("register query Q1 rstream [1 second]") and range rstream 453 is specified. If the flow at 1104 is Yes, the flow at 1106 replaces Range Rstream Operator 453 into Partition Row Rstream Operator 443, sets the partition group as grouping column value ("id"), and sets the partition row rstream size as (range rstream size (1 second)/interval value (1 second)=1), which is the same as "Rstream [partition by id rows 1]". If the flow at 1107 is No, and the flow at 1109 is also No, the flow at 1102 refers to Q2 row 712. At 1103, the rstream is used in Q2 503 ("register query Q2 rstream [60 second]"), and range rstream 458 is specified. If the flow at 1104 is No, the flow at 1105 replaces Range Rstream Operator 458 with Row Rstream Operator 448. Row rstream size is set as (range rstream size (60 second)/ interval value (3 second)=20), which is the same as "Rstream [rows 20]". If the flow at 1107 is Yes, then the flow at 1108 inserts output Tuple Timestamp Adjustment Module 434 between Query Execution Module 431 and tuples 171-176. The flow at 1109 in this example execution is Yes, and as a result, Query Execution Module 461 in FIG. 4B is converted into Query Execution Module 431 in FIG. 4A, and Input Interval Check Module 432, Interval Adjustment Tuple Generating Module 433, and Output Tuple Timestamp Adjustment Module 434 in FIG. 4A are inserted.

Figure 12A:
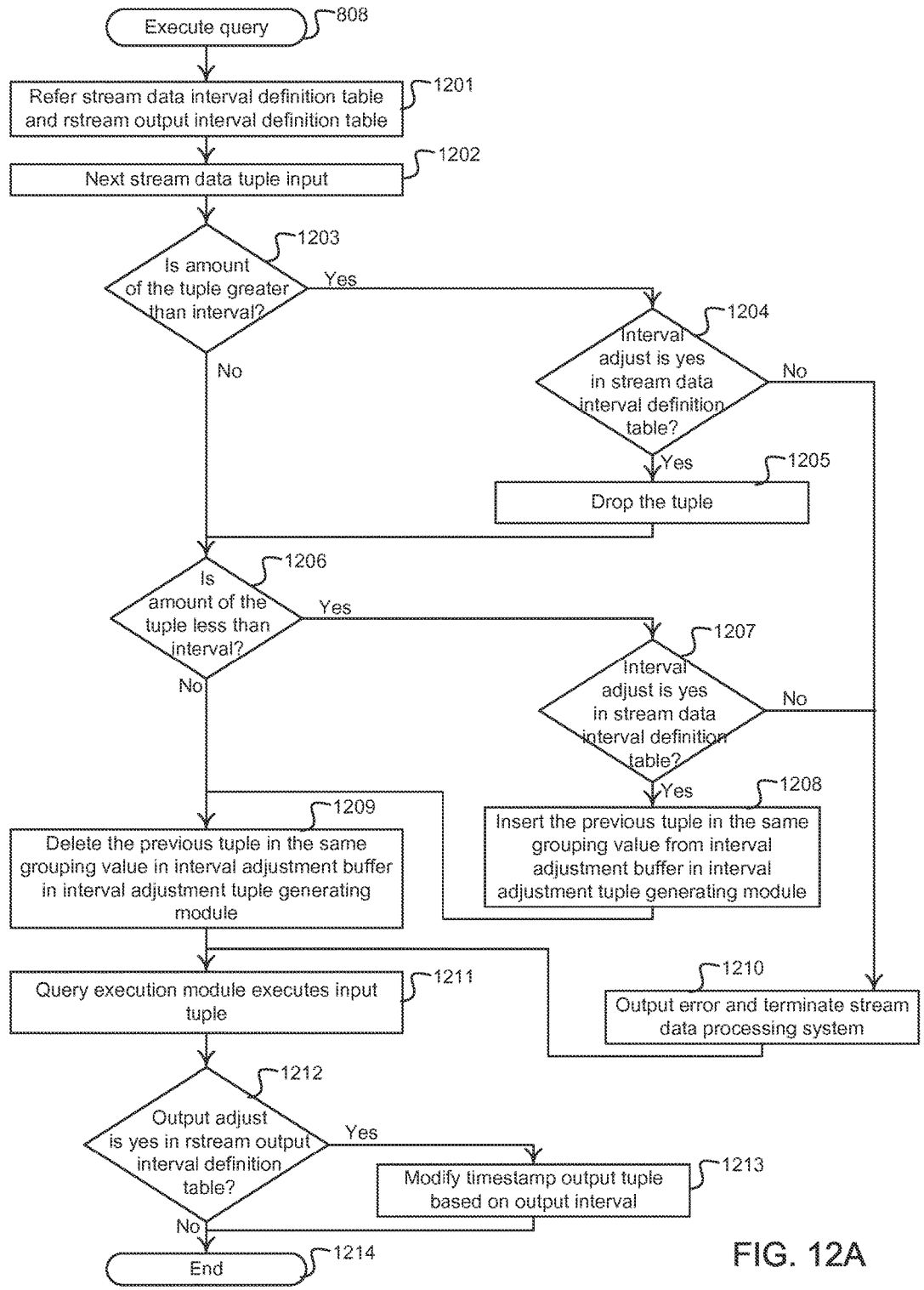
FIG. 12A illustrates a flow diagram for executing a query in accordance with an example implementation.

FIG. 12A illustrates a flow diagram for executing a query 808 in accordance with an example implementation. The flow at 1201 refers to Stream Data Interval Definition Table 418 in FIG. 6 and Rstream Output Interval Definition Table 419 in FIG. 7. At 1202, Input Interval Check Module 432 receives the next stream data tuple input. At 1203, Input Interval Check Module 432 determines whether or not the amount of the tuple in this interval is greater than the amount calculated by the interval. At 1204, Input Interval Check Module 432 determines whether or not the value of interval adjust column 604 in Stream Data Interval Definition Table 418 is "yes". If so (Yes), Interval Adjustment Tuple Generating Module 433 drops the input tuple at 1205, otherwise (No), the flow proceeds to 1210.

At 1206, Input Interval Check Module 432 determines whether or not the amount of the tuple in this interval is less than the amount calculated by the interval. If so (Yes), the flow proceeds to 1207, otherwise (No) the flow proceeds to 1209. At 1207, Input Interval Check Module 432 determines whether or not the value of the interval adjust column 604 in Stream Data Interval Definition Table 418 is "yes". If so (Yes), then Interval Adjustment Tuple Generating Module 433 inserts the previous tuple in the same grouping value from the interval adjustment buffer in Interval Adjustment Tuple Generating Module 433 at 1208. Otherwise (No), the flow proceeds to 1210.

At 1209, Interval Adjustment Tuple Generating Module 433 deletes the previous tuple in the same grouping value in the interval adjustment buffer in Interval Adjustment Tuple Generating Module 433. At 1210, Interval Adjustment Tuple Generating Module 433 outputs an error and terminates stream data processing system 121. At 1211, Query Execution Module 431 executes the input tuple. At 1212, Output Tuple Timestamp Adjustment Module 434 determines whether or not the value of output adjust column 704 in Rstream Output Interval Definition Table 419 is "yes". If so (Yes), then Output Tuple Timestamp Adjustment Module 434 modifies the timestamp of output tuple based on the value of output interval column 703 in Rstream Output Interval Definition Table 419 at 1213. At 1214, the flow ends.

In an example implementation of FIG. 12A, input tuples 201-219 of FIG. 3 arrive. S1 row 611 in FIG. 6 describes the interval in each group ("id") as 1 second. In FIG. 3, No is selected for the flow at 1203 and 1206. If an additional tuple (a, 2.5) is input at 9:00:02.50, Yes is selected for the flow at 1203. If Yes is selected at 1204, drop tuple (a, 2.5) at 1205. If tuple 204 doesn't arrive at 9:00:05, Yes is selected at 1206. If Yes is selected at 1207, insert the previous tuple in the same grouping value 203 (a, 3) from interval adjustment buffer in Interval Adjustment Tuple Generating Module 433. If output adjust value 704 is "yes" in Q1 row 711, Yes is selected at 1212. Modify Timestamp Output Tuple 384 and 394 based on output interval (1 sec). The timestamps of 384 and 394 are changed from 9:00:04.50 to 9:00:04.00.

Figure 12B:
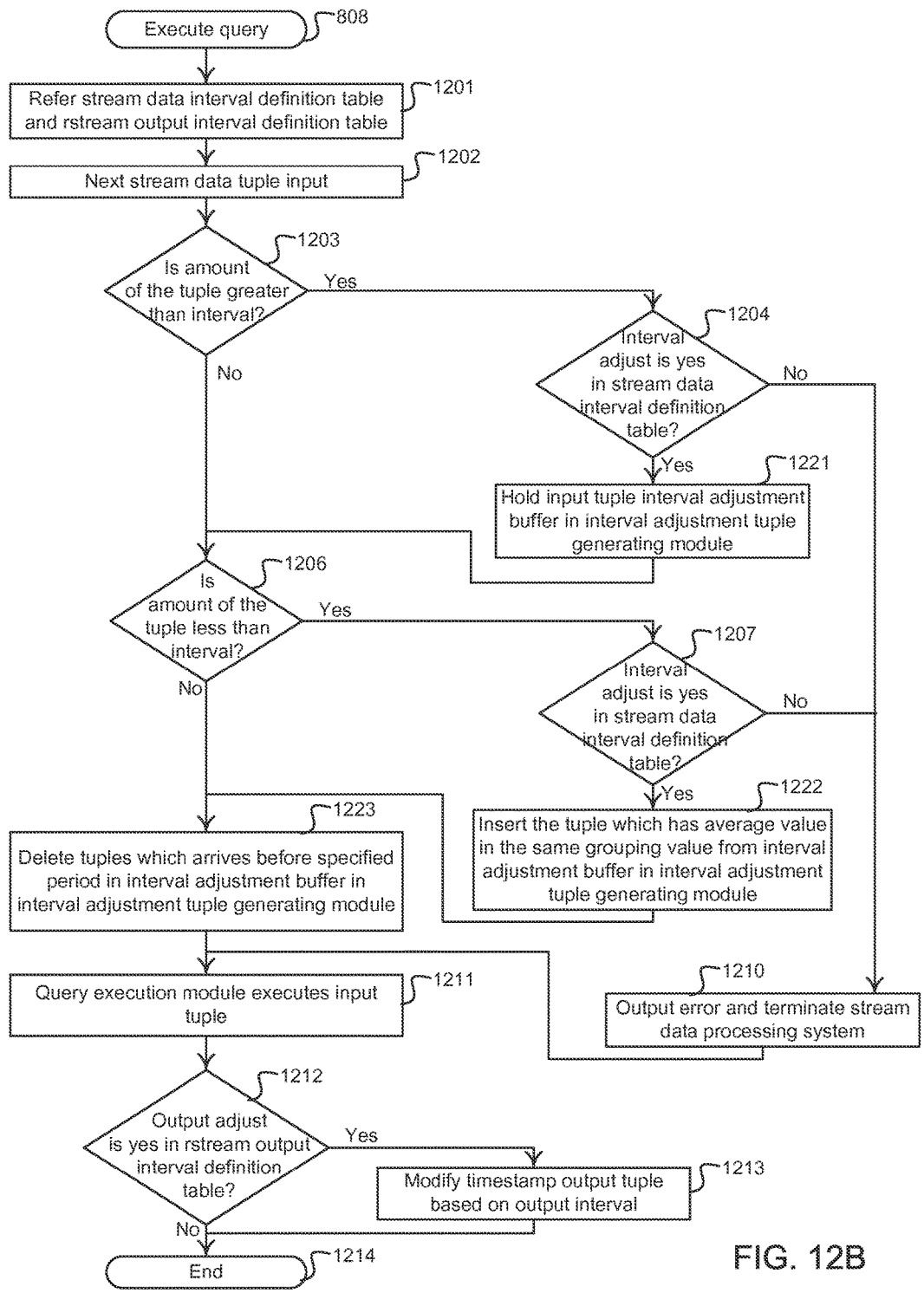
FIG. 12B is an alternate flow diagram example of FIG. 12A.

FIG. 12B is an alternate flow diagram example of FIG. 12A. The flow processes at 1201-1204, 1206-1207, 1210-1214 are the same as in FIG. 12A.

The flow at 1221 is an alternative version of the flow at 1205. Interval Adjustment Tuple Generating Module 433 holds the input tuple in the interval adjustment buffer in Interval Adjustment Tuple Generating Module 433. The flow at 1222 is an alternative version of the flow at 1208. Interval Adjustment Tuple Generating Module 433 inserts the tuple which has an average value in the same grouping value from the interval adjustment buffer in the interval adjustment tuple generating module. The flow at 1223 is an alternative version of the flow at 1209. Interval Adjustment Tuple Generating Module 433 deletes tuples which have arrived before a specified period in the interval adjustment buffer in the interval adjustment tuple generating module. The implementation of alternative versions as shown in FIG. 12B can be used or omitted as needed, depending on the desired implementation.

By replacing the range window which holds a certain period of stream data into a row window which holds a certain amount of stream data (from FIG. 4B to FIG. 4A), the process can provide the result based on the data source timestamp in the stream data processing server based on the arrival timestamp. This process has a lower latency than processing methods which are based on data source timestamp because the server doesn't need to wait until all data arrives to the server. In the first example implementation, stream data interval definition and rstream output interval definition are set as the table format. In the second example implementation, the stream data interval definition and the rstream output interval definition are set as the query format.

Second Example Implementation

Figure 13:
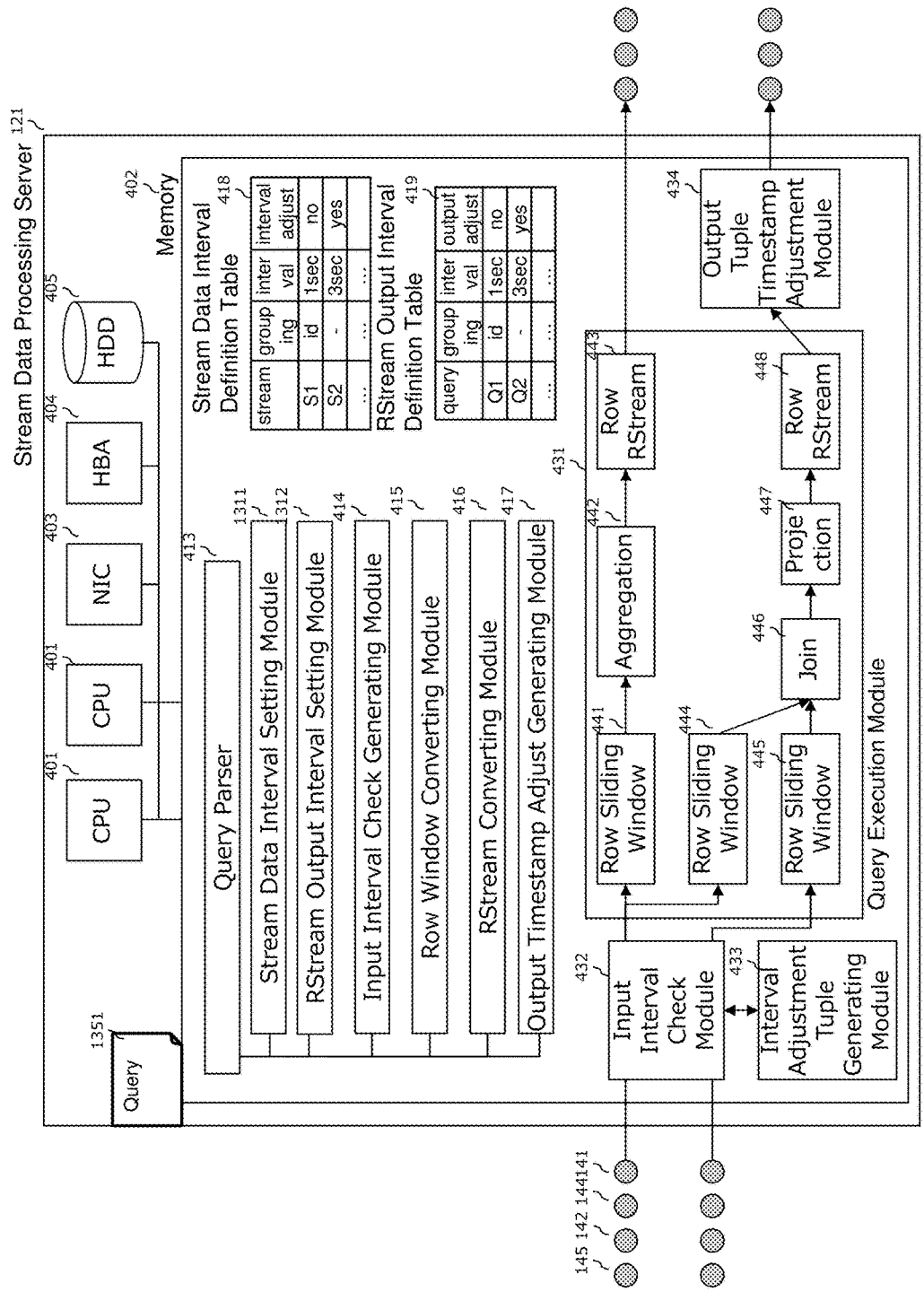
FIG. 13 illustrates an example implementation of a stream data processing server.

FIG. 13 illustrates an example implementation of a stream data processing server, similar to FIG. 4A. Query 151 is changed to Query 1351. In FIG. 13, Stream Data Interval Setting Module 411 is changed into Stream Data Interval Setting Module 1311. Parse stream data interval definition in Query 1351 and update Stream Data Interval Definition Table 418. RStream Output Interval Setting Module 412 is changed into RStream Output Interval Setting Module 1312. Parse rstream output interval definition in Query 1351 and update RStream Output Interval Definition Table 419.

FIG. 14 illustrates an example query, in accordance with an example implementation. Stream registration command 1401 is related to command 501, in which "interval 1 second group by id" is added from S1 stream definition, and mapped into Stream Data Interval Definition Table 418 in FIG. 6. In S1 row 611, stream column 601 is "S1", grouping column 602 is id, interval column 603 is "1 sec", and interval adjust column 604 is "no". "Interval 3 second with interval adjust" is added from S2 stream definition in stream registration command 501, and is mapped into Stream Data Interval Definition Table 418 in FIG. 6. In S2 row 612, stream column 601 is "S2", grouping column 602 is "-", interval column 603 is "3 sec", and interval adjust column 604 is "yes". Stream registration command 1402 is related to stream registration command 502, in which "interval 1 second group by id" is added from command 502, and mapped into RStream Output Interval Definition Table 419 in FIG. 7. In Q1 row 711, query column 701 is "Q1", grouping column 702 is "id", interval column 703 is "1 sec", and output adjust column 704 is "no". Stream registration command 1403 is related to stream registration command 503, in which "interval 3 second with output adjust" is added from command 503 and mapped into RStream Output Interval Definition Table 419 in FIG. 7. In Q2 row 712, query column 701 is "Q2", grouping column 702 is "-", interval column 703 is "3 sec", and output adjust 704 is "yes".

Figure 15:
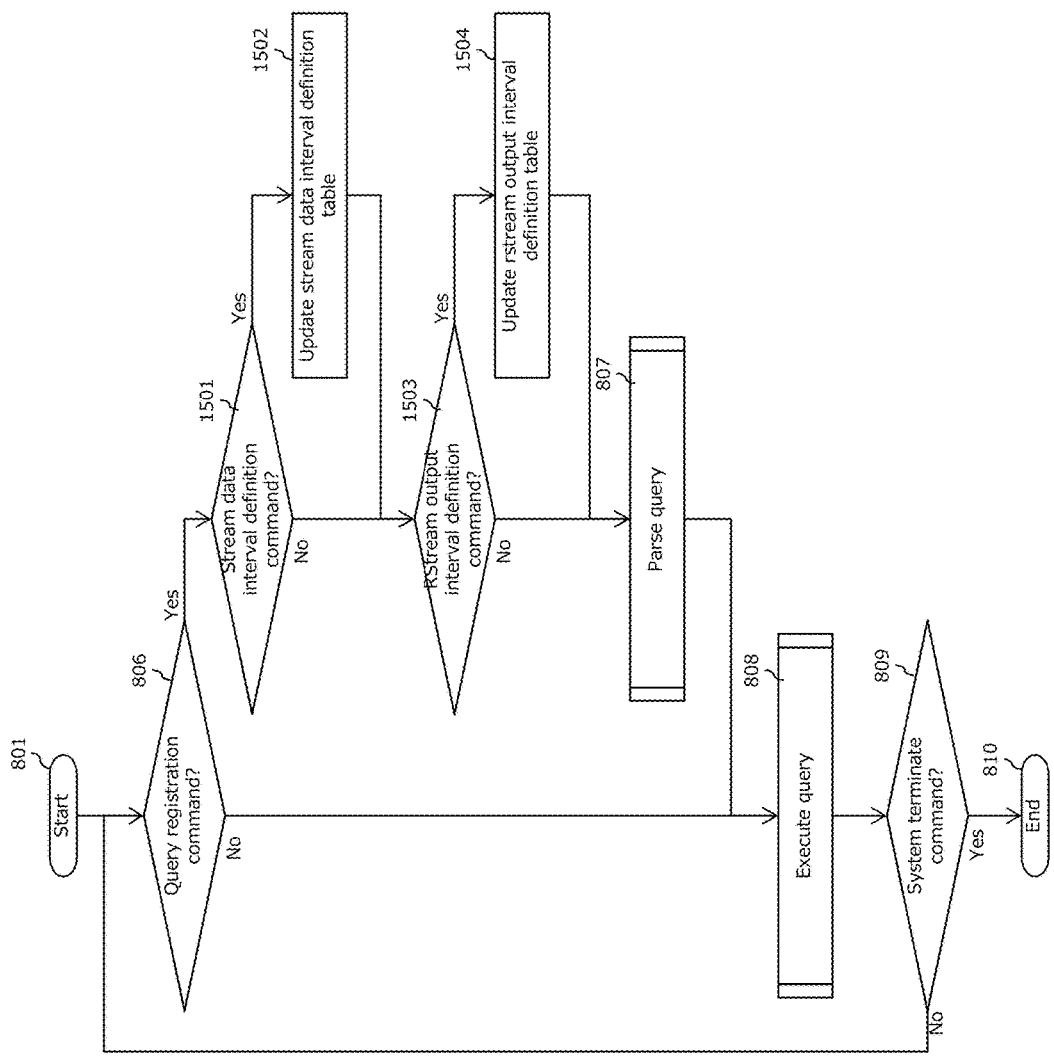
FIG. 15 illustrates an example flowchart showing an overall process performed in the stream data processing server, in accordance with an example implementation.

FIG. 15 illustrates an example flowchart showing an overall process performed in the stream data processing server, in accordance with an example implementation. Specifically, FIG. 15 is another possible implementation of FIG. 8. Process flows 801, and 806-810 are the same as in FIG. 8. In the flow at 1501, Stream Data Interval Setting Module 1311 determines whether or not the query registration command includes a stream data interval definition command. If so (Yes), then the flow proceeds to 1502, wherein Stream Data Interval Setting Module 1311 updates Stream Data Interval Definition Table 418. At 1503, RStream Output Interval Setting Module 1312 determines whether or not the query registration command includes an rstream output interval definition command. If so (Yes), then at 1504, RStream Output Interval Setting Module 1312 updates RStream Output Interval Definition Table 419.

In the second example implementation, the range sliding window clause and the range rstream clause in the query are replaced into the row sliding window clause and the row rstream clause; in addition, the input interval checking module, the interval adjustment tuple generating module, and the output tuple timestamp adjustment module are inserted.

Third Example Implementation

Figure 16:
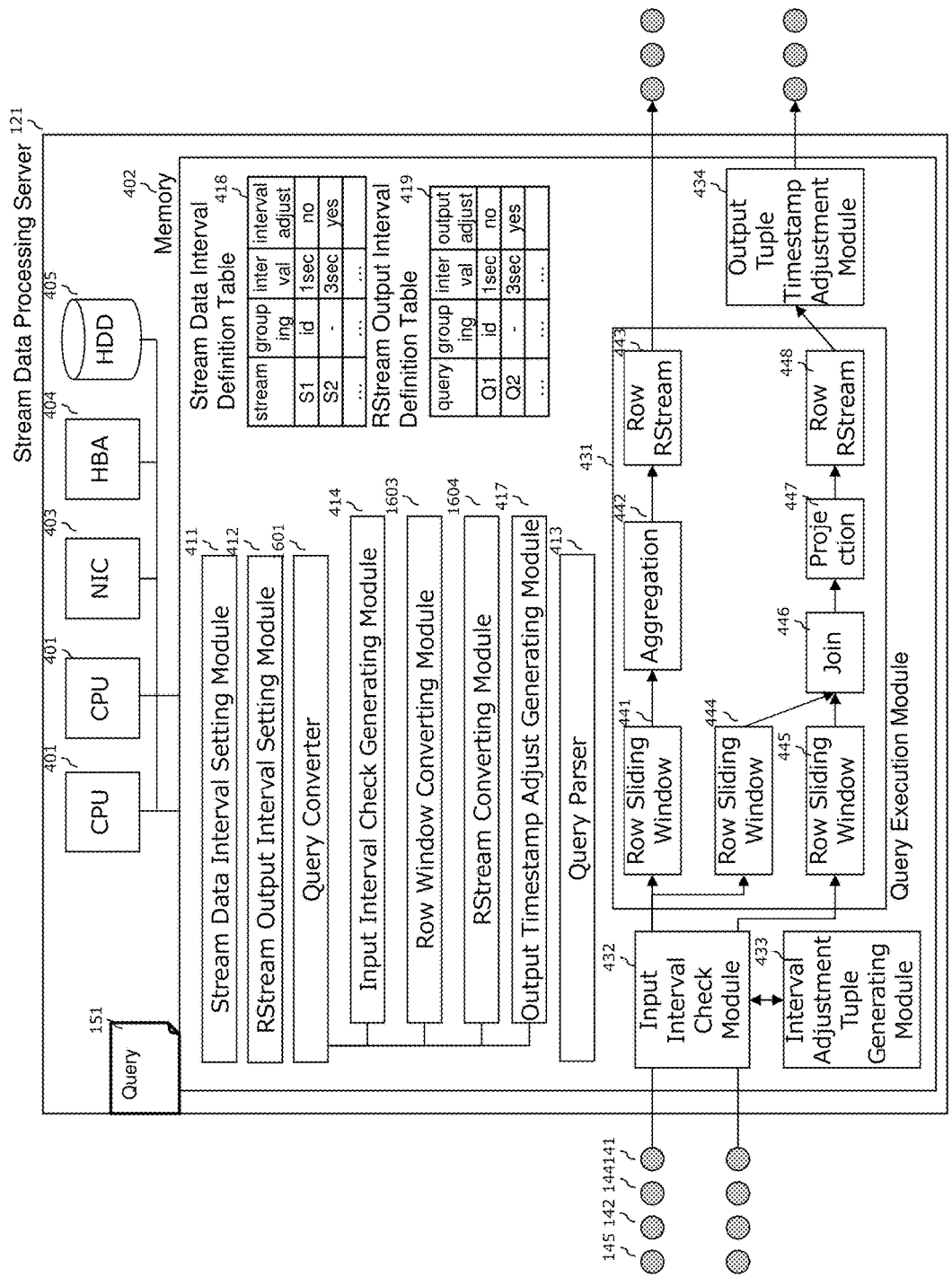
FIG. 16 illustrates an example implementation of a stream data processing server.

FIG. 16 illustrates an example implementation of a stream data processing server, similar to FIG. 4A. Query Converter 1601 converts the query string and calls Input Interval Check Generating Module 414, Row Window Converting Module 1603, RStream Converting Module 1604, and Output Timestamp Adjust Generating Module 417. Input Interval Check Generating Module 414 and Output Timestamp Adjust Generating Module 417 are the same as in FIG. 4A.

Row Window Converting Module 1603 converts the range sliding window clause in Query 151 into a row sliding window clause based on Stream Data Interval Definition Table 418.

RStream Converting Module 1604 converts the range rstream clause in Query 151 into a row rstream clause based on RStream Output Interval Definition Table 419. Query Parser 413 is the same as in FIG. 4A. Query Parser 413 parses the converted query with the conventional method and generates Query Execution Module 431.

Figure 17:
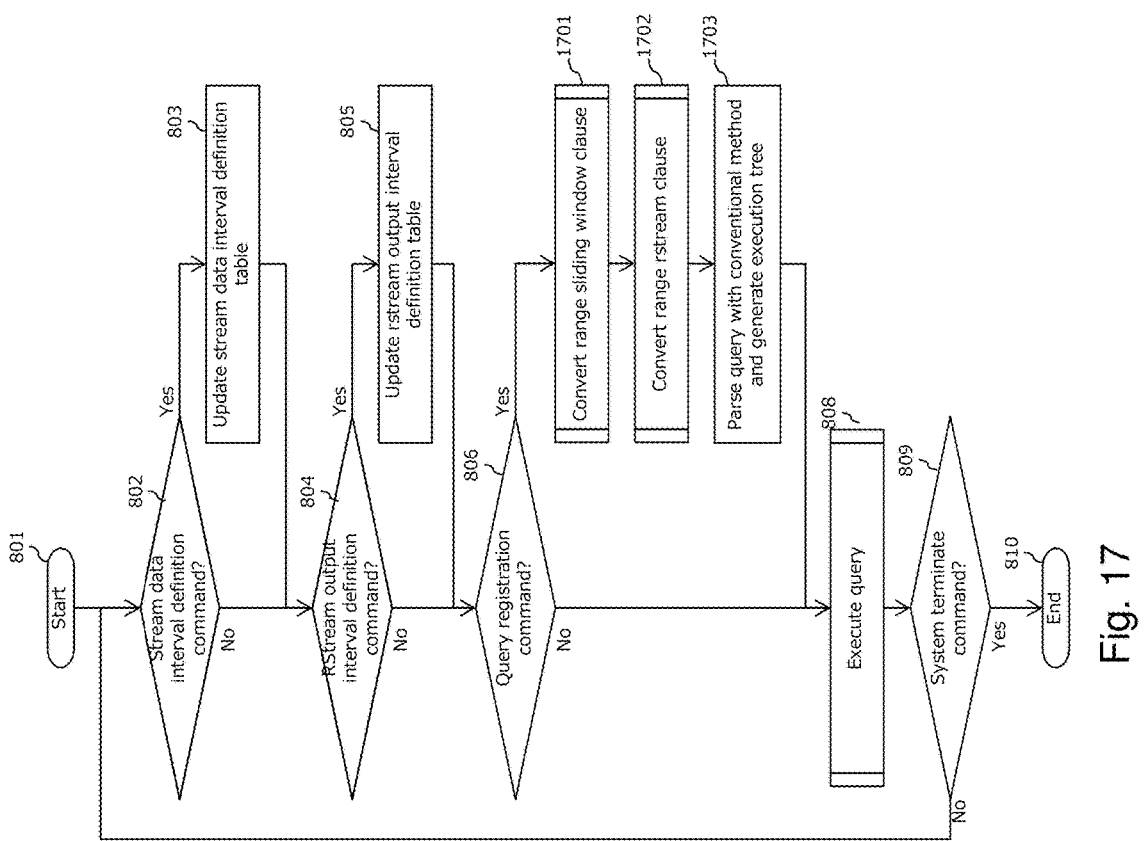
FIG. 17 illustrates an example flowchart showing an overall process performed in the stream data processing server, in accordance with an example implementation.

FIG. 17 illustrates an example flowchart showing an overall process performed in the stream data processing server, in accordance with an example implementation, and is similar to FIG. 8. The process flow at 801-806, and 808-810 are the same as in FIG. 8. The flow at 1701 changes the range sliding window clause into the row sliding window clause in Query 151, and is related to the flow at 902 in FIG. 9, and as further described in FIG. 18. The flow at 1702 changes the range rstream clause into a row rstream clause in Query 151. This flow is related to the flow at 903 in FIG. 9, and as further described in FIG. 19. The flow at 1703 is the same as the flow of 901 in FIG. 9.

Figure 18:
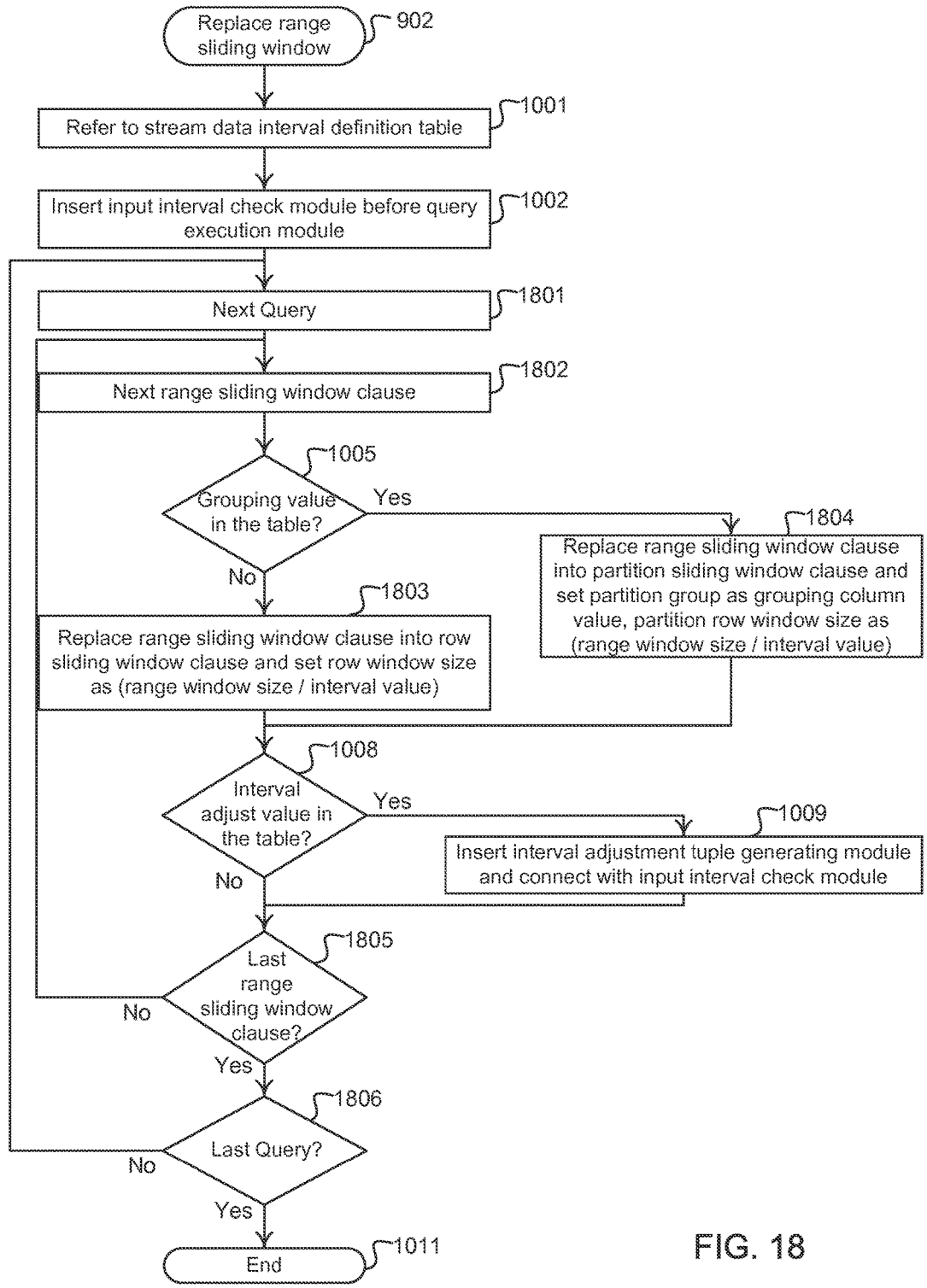
FIG. 18 illustrates an example flow diagram for replacing the range sliding window, in accordance with an example implementation.

FIG. 18 illustrates an example flow diagram for replacing the range sliding window, in accordance with an example implementation. FIG. 18 is similar to FIG. 10. The flow at 1001-1002, 1005, 1008-1009, and 1011 is the same as in FIG. 10. For the flow at 1801, Row Window Converting Module 1603 refers to the next query definition in Query 151. At 1802, Row Window Converting Module 1603 refers to the next range sliding window clause in Query 151.

At 1803, Row Window Converting Module 1603 changes the range sliding window clause into the row sliding window clause. Row Window Converting Module 1603 sets the row window size as (range window size/interval value). At 1804, Row Window Converting Module 1603 changes the range sliding window clause into a partition sliding window clause. Row Window Converting Module 1603 sets the partition group as the grouping column value, and the partition row window size as (range window size/interval value). At 1805, Row Window Converting Module 1603 determines whether or not the range sliding window is last in the query. If not (No), then the flow reverts to 1801 to process the next sliding window clause, otherwise (Yes), the flow proceeds to 1806. At 1806, Row Window Converting Module 1603 determines whether or not the query is the last one. If not (No), then the flow proceeds back to 1801 to process the next query.

Figure 19:
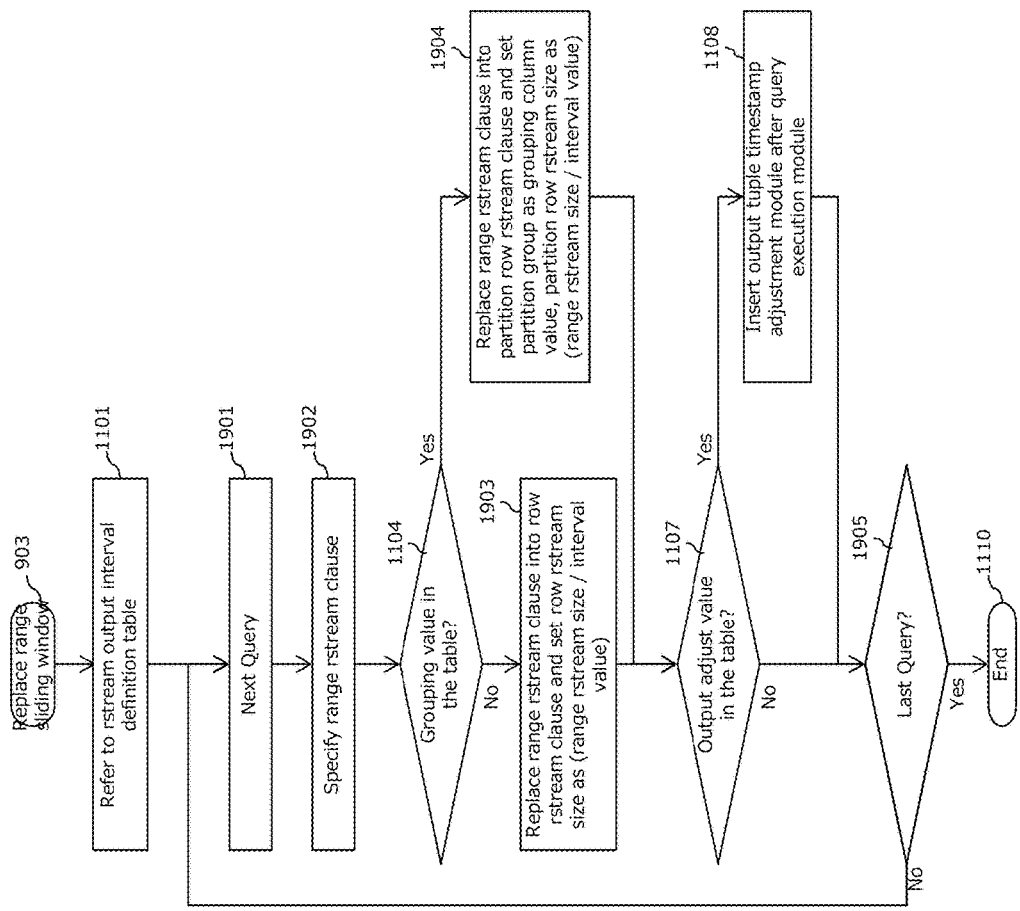
FIG. 19 illustrates an example flow for replacing the range sliding window, in accordance with an example implementation.

FIG. 19 illustrates an example flow for replacing the range sliding window, in accordance with an example implementation, and is related to FIG. 11. The process flow at 1101, 1104, 1107-1108, and 1110 is the same as in FIG. 11. At 1901, RStream Converting Module 1604 refers to the next query definition in Query 151. At 1902, RStream Converting Module 1604 specifies a range rstream clause in the query. At 903, RStream Converting Module 1604 moves the range rstream clause into the row rstream clause. RStream Converting Module 1604 sets the row rstream size as (range rstream size/interval value). At 1904, RStream Converting Module 1604 moves the range rstream clause into the partition row rstream clause. RStream Converting Module 1604 sets the partition group as the grouping column value, and sets the partition row rstream size as (range rstream size/interval value). At 1905, RStream Converting Module 1604 determines whether or not the query is the last one. If not (No), the flow proceeds to 1901 to process the next query.

FIG. 20 illustrates an example query, in accordance with an example implementation, and is similar to FIG. 5. Converted stream registration command 2001 is the same as converted command 501. Converted stream registration command 2002 is the same as the converted command from 502. Converted stream registration command 2003 is the same as the converted command from 503.

In an example execution of the flow diagram of FIG. 18, Query 151 in FIG. 5 is registered. After Converted Query 501 is parsed, queries 502 and 503 are parsed. The flow of 1001 refers to Stream Data Interval Definition Table 418 in FIG. 6. At 1002, Input Interval Check Module 432 is inserted. The flow at 1801 refers to Query 502. The flow at 1802 specifies "S1[range 3 second]" in Query 502. The flow at 1005 is Yes because grouping column in S1 Row 611 is set ("id"). The flow at 1804 moves the range sliding window clause into the partition sliding window clause, and sets the partition group as grouping column value ("id"), and the partition row window size as (range window size (3 sec)/interval value (1 sec)=3). "S1[range 3 second]" in Query 502 is converted into "S1[partition by id rows 3]". If the flow at 1008 is No, the flow at 1805 is Yes, and the flow at 1806 is No, then the flow at 1801 refers to Query 503.

The flow at 1801 specifies "S1[range 5 second]". If the flow at 1005 is Yes, then the flow at 1804 moves the range sliding window clause into the partition sliding window clause, and sets the partition group as grouping column value ("id"), and the partition row window size as (range window size (5 sec)/interval value (1 sec)=3). "S1[range 5 second]" in Query 502 is converted into "S1[partition by id rows 5]".

If the flow at 1008 is No, and the flow at 1805 is No, then the flow at 1802 specifies "S2[range 12 second]". If the flow at 1005 is No, then the flow at 1803 moves the range sliding window clause into the row sliding window clause, and sets the row window size as (range window size (12 sec)/interval value (3 sec)=4). "S2[range 12 second]" in Query 502 is converted into "S2[rows 4]".

If the flow at 1008 is Yes, then the flow at 1009 inserts Interval Adjustment Tuple Generating Module 433. If the flow at 1805 is Yes, and the flow at 1806 is Yes, then the process ends.

In an example execution of FIG. 19, the flow at 1101 refers to RStream Output Interval Definition Table 419 in FIG. 7. The flow at 1901 refers to Query 502. The flow at 1902 specifies "rstream [1 second]". The flow at 1104 is Yes because grouping column in Q1 Row 711 is set ("id"). The flow at 1904 moves the range rstream clause into the partition row rstream clause, and sets the partition group as grouping column value ("id"), and the partition row rstream size as (range rstream size (1 sec)/interval value (1 sec)=1). "RStream [1 second]" is converted into "rstream [partition by id rows 1]". If the flow at 1107 is No, and the flow at 1905 is No, then the flow at 1901 refers to Query 503. The flow at 1902 specifies "rstream [60 second]".

If the flow at 1104 is No, then the flow at 1903 moves the range rstream clause into the row rstream clause, and sets the row rstream size as (range rstream size (60 sec)/interval value (3 sec)=20). "RStream [60 second]" is converted into "rstream [rows 20]". If the flow at 1107 is Yes, then the flow 1108 inserts Output Tuple Timestamp Adjustment Module 434. If the flow at 1905 is Yes, the process ends.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example implementations, the steps carried out require physical manipulations of tangible quantities for achieving a tangible result.

Moreover, other implementations of the present application will be apparent to those skilled in the art from consideration of the specification and practice of the example implementations disclosed herein. Various aspects and/or components of the described example implementations may be used singly or in any combination. It is intended that the specification and examples be considered as examples, with a true scope and spirit of the application being indicated by the following claims.

What is claimed is:

1. A non-transitory computer readable medium containing instructions for executing a process, the instructions comprising:
   determining one or more stream data interval definitions from stream data interval information;
   generating an input interval check module configured to detect periodic arrival of stream data based on the one or more stream data interval definitions;
   for each of the one or more stream data interval definitions, configuring a query execution module by:
   determining one or more range window operators of the query execution module associated with the each of the one or more stream data interval definitions;
   modifying the determined one or more range window operators into a row based sliding window operator for grouping information not being indicative of a grouping being set from the one or more stream data interval definitions, and a time based sliding window operator for the grouping information being indicative of a grouping being set from the one or more stream data interval definitions; and
   adjusting a row window size of the query execution module.

2. The non-transitory computer readable medium of claim 1, wherein the configuring the query execution module further comprises inserting, if the periodic arrival of the stream data is to be adjusted, an interval adjustment tuple generating module to connect with the input interval check module, the interval adjustment tuple generating module configured to drop at least one tuple upon receipt of one or more excess tuples and insert an interval adjustment tuple upon detecting an omission of a tuple.

3. The non-transitory computer readable medium of claim 2, wherein the instructions further comprise:
if the periodic arrival of the stream data is to be adjusted:
dropping a tuple from the periodic arrival of the stream data, if a number of tuples received is greater than an interval to be received;
inserting a previous tuple having a same grouping value from an interval adjustment buffer in the interval adjustment tuple generating module, if the number of tuples received is less than the interval to be received; and
deleting the previous tuple in the same grouping value from the interval adjustment buffer in the interval adjustment tuple generating module.

4. The non-transitory computer readable medium of claim 1, wherein the instructions further comprise updating one or more rstream output interval definitions upon receipt of an rstream output interval definition command, and
wherein the modifying the determined one or more range window operators into one of the row based sliding window operator and the time based sliding window operator comprises determining an rstream operator from a query, and based on the grouping information, performing one of:
replacing one of the determined one or more range window operators into the row based sliding window operator and setting row rstream size based on a ratio of a range rstream size and an interval value;
replacing one of the determined one or more range window operators with the time based sliding window operator and setting a partition row rstream size based on a ratio of the range rstream size and the interval value.

5. The non-transitory computer readable medium of claim 4, wherein the instructions further comprise inserting, after the query execution module, an output tuple timestamp adjustment module configured to modify a timestamp of output of the query execution module.

6. The non-transitory computer readable medium of claim 5, wherein the output tuple timestamp adjustment module is configured to modify the timestamp based on an arrival interval of the output and output adjust information.

7. The non-transitory computer readable medium of claim 1, wherein the instructions further comprise: processing a query registration command for a stream data interval definition command and an rstream output interval definition command;
updating the one or more stream data interval definitions based on the stream data interval definition command; and
updating one or more rstream output interval definitions based on the rstream output interval definition command.

8. The non-transitory computer readable medium of claim 1, wherein the instructions further comprise, upon receipt of a query registration command:
converting range sliding window clauses in a query into row sliding window clauses;
converting range rstream clauses in the query into row rstream clauses; and
generating an execution tree from the query.

9. The non-transitory computer readable medium of claim 1, wherein the determined one or more range window operators comprises one or more range stream clauses, and wherein the modifying the determined one or more range window operators into one of the row based sliding window operator and the time based sliding window operator comprises, based on the grouping information, performing one of:
replacing the one or more range rstream clauses with a row rstream clause and setting row rstream size based on a ratio of a range rstream size and an interval value;
replacing the one or more range rstream clauses with a time based rstream clause and setting a partition row rstream size based on a ratio of the range rstream size and the interval value.

10. A method, comprising:
determining one or more stream data interval definitions from stream data interval information;
generating an input interval check module configured to detect periodic arrival of stream data based on the one or more stream data interval definitions;
for each of the one or more stream data interval definitions, configuring a query execution module by:
determining one or more range window operators of the query execution module associated with the each of the one or more stream data interval definitions;
modifying the determined one or more range window operators into a row based sliding window operator for grouping information not being indicative of a grouping being set from the one or more stream data interval definitions, and a time based sliding window operator for the grouping information being indicative of a grouping being set from the one or more stream data interval definitions; and
adjusting a row window size of the query execution module.

11. The method of claim 10, wherein the configuring the query execution module further comprises inserting, if the periodic arrival of the stream data is to be adjusted, an interval adjustment tuple generating module to connect with the input interval check module, the interval adjustment tuple generating module configured to drop at least one tuple upon receipt of one or more excess tuples and insert an interval adjustment tuple upon detecting an omission of a tuple.

12. The method of claim 11, further comprising:
if stream data is to be adjusted:
dropping a tuple from the periodic arrival of the stream data, if a number of tuples received is greater than an interval to be received;
inserting a previous tuple having a same grouping value from an interval adjustment buffer in the interval adjustment tuple generating module, if the number of tuples received is less than the interval to be received; and
deleting the previous tuple in the same grouping value from the interval adjustment buffer in the interval adjustment tuple generating module.

13. The method of claim 10, further comprising updating one or more rstream output interval definitions upon receipt of an rstream output interval definition command, and
wherein the modifying the determined one or more range window operators into one of the row based sliding window operator and the time based sliding window operator comprises determining an rstream operator from a query, and based on the grouping information, performing one of:

replacing one of the determined one or more range window operators into the row based sliding window operator and setting row rstream size based on a ratio of a range rstream size and an interval value;

replacing one of the determined one or more range window operators with the time based sliding window operator and setting a partition row rstream size based on a ratio of the range rstream size and the interval value.

14. The method of claim 13, further comprising inserting, after the query execution module, an output tuple timestamp adjustment module configured to modify a timestamp of output of the query execution module.

15. A server, comprising:

a processor, configured to:

determine one or more stream data interval definitions from stream data interval information;

generate an input interval check module configured to detect periodic arrival of stream data based on the one or more stream data interval definitions;

for each of the one or more stream data interval definitions, configure a query execution module by:

determining one or more range window operators of the query execution module associated with the each of the one or more stream data interval definitions;

modifying the determined one or more range window operators into a row based sliding window operator for grouping information not being indicative of a grouping being set from the one or more stream data interval definitions, and a time based sliding window operator for the grouping information being indicative of a grouping being set from the one or more stream data interval definitions; and adjusting a row window size of the query execution module.

16. The server of claim 15, wherein the processor is configured to configure the query execution module by inserting, if the periodic arrival of the stream data is to be adjusted, an interval adjustment tuple generating module to connect with the input interval check module, the interval adjustment tuple generating module configured to drop at least one tuple upon receipt of one or more excess tuples and insert an interval adjustment tuple upon detecting an omission of a tuple.

17. The server of claim 16, wherein the processor is configured to:

if stream data is to be adjusted:

drop a tuple from the periodic arrival of the stream data, if a number of tuples received is greater than an interval to be received;

insert a previous tuple having a same grouping value from an interval adjustment buffer in the interval adjustment tuple generating module, if the number of tuples received is less than the interval to be received; and delete the previous tuple in the same grouping value from the interval adjustment buffer in the interval adjustment tuple generating module.

18. The server of claim 15, wherein the processor is further configured to update one or more rstream output interval definitions upon receipt of an rstream output interval definition command, and wherein the processor is further configured to modify the determined one or more range window operators into one of the row based sliding window operator and the time based sliding window operator by determining an rstream operator from a query, and based on the grouping information, performing one of:

replacing one of the determined one or more range window operators into the row based sliding window operator and setting row rstream size based on a ratio of a range rstream size and an interval value;

replacing one of the determined one or more range window operators with the time based sliding window operator and setting a partition row rstream size based on a ratio of the range rstream size and the interval value.

19. The server of claim 18, wherein the processor is further configured to insert, after the query execution module, an output tuple timestamp adjustment module configured to modify a timestamp of output of the query execution module.

20. The server of claim 19, wherein the output tuple timestamp adjustment module is configured to modify the timestamp based on an arrival interval of the output and output adjust information.

\* \* \* \* \*